US006963412B1

(12) United States Patent
Toda

(10) Patent No.: US 6,963,412 B1
(45) Date of Patent: Nov. 8, 2005

(54) INFORMATION PROCESSING APPARATUS, INFORMATION PROCESSING METHOD, STORAGE MEDIUM, AND PROGRAM

(75) Inventor: Masanari Toda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 831 days.

(21) Appl. No.: 09/605,008

(22) Filed: Jun. 27, 2000

(30) Foreign Application Priority Data

Jun. 29, 1999 (JP) ............................. 11-183332
Jun. 7, 2000 (JP) ....................... 2000-170657

(51) Int. Cl.[7] .............................................. G06F 15/00
(52) U.S. Cl. ...................... 358/1.13; 358/1.1; 358/1.15
(58) Field of Search ......................... 358/1.1, 1.2, 1.5, 358/1.15, 1.16, 1.17, 1.13

(56) References Cited

U.S. PATENT DOCUMENTS

| 5,293,463 | A | * | 3/1994 | Masuda .................... 358/1.1 |
| 5,337,358 | A | | 8/1994 | Axelrod et al. ............... 380/22 |
| 5,509,115 | A | * | 4/1996 | Butterfield et al. ......... 345/418 |
| 5,533,175 | A | * | 7/1996 | Lung et al. ................ 358/1.16 |
| 5,978,561 | A | * | 11/1999 | Kimura et al. ............. 358/1.16 |
| 6,014,224 | A | * | 1/2000 | Mitani ....................... 358/1.16 |
| 6,249,835 | B1 | * | 6/2001 | Isoda .......................... 710/100 |
| 6,266,497 | B1 | * | 7/2001 | Maekawa .................... 399/85 |
| 6,327,044 | B1 | * | 12/2001 | Shima ....................... 358/1.15 |
| 6,346,998 | B2 | * | 2/2002 | Shiota et al. ................ 358/487 |
| 6,493,099 | B2 | | 6/2002 | Nakagiri .................... 358/1.13 |
| 6,480,295 | B1 | * | 11/2002 | Taoda ........................ 358/1.16 |
| 6,587,216 | B1 | * | 7/2003 | Yamada ..................... 358/1.11 |

OTHER PUBLICATIONS

U.S. Appl. No. 09/298,959, filed Apr. 26, 1999, Toda.
U.S. Appl. No. 09/144,494, filed Aug. 31, 1998, Oomura et al.

* cited by examiner

Primary Examiner—Edward Coles
Assistant Examiner—Alan Rahimi
(74) Attorney, Agent, or Firm—Fitzpatrick, Cella, Harper & Scinto

(57) ABSTRACT

Selection of an optimum print data conversion is provided such that: in a first conversion, print data is converted into image data, in a second conversion, the print data is converted into code data which is used by a printer to generate the image data; predictions are made as regards a printing time using the image data converted in the first conversion and a printing time using the code data converted in the second conversion, a determination is made whether the printing time using the image data is shorter than the printing time using the code data, and the first conversion is selected when it is determined that the printing time using the image data is shorter and the second conversion is selected when it is determined that the printing time using the image data is not shorter.

42 Claims, 22 Drawing Sheets

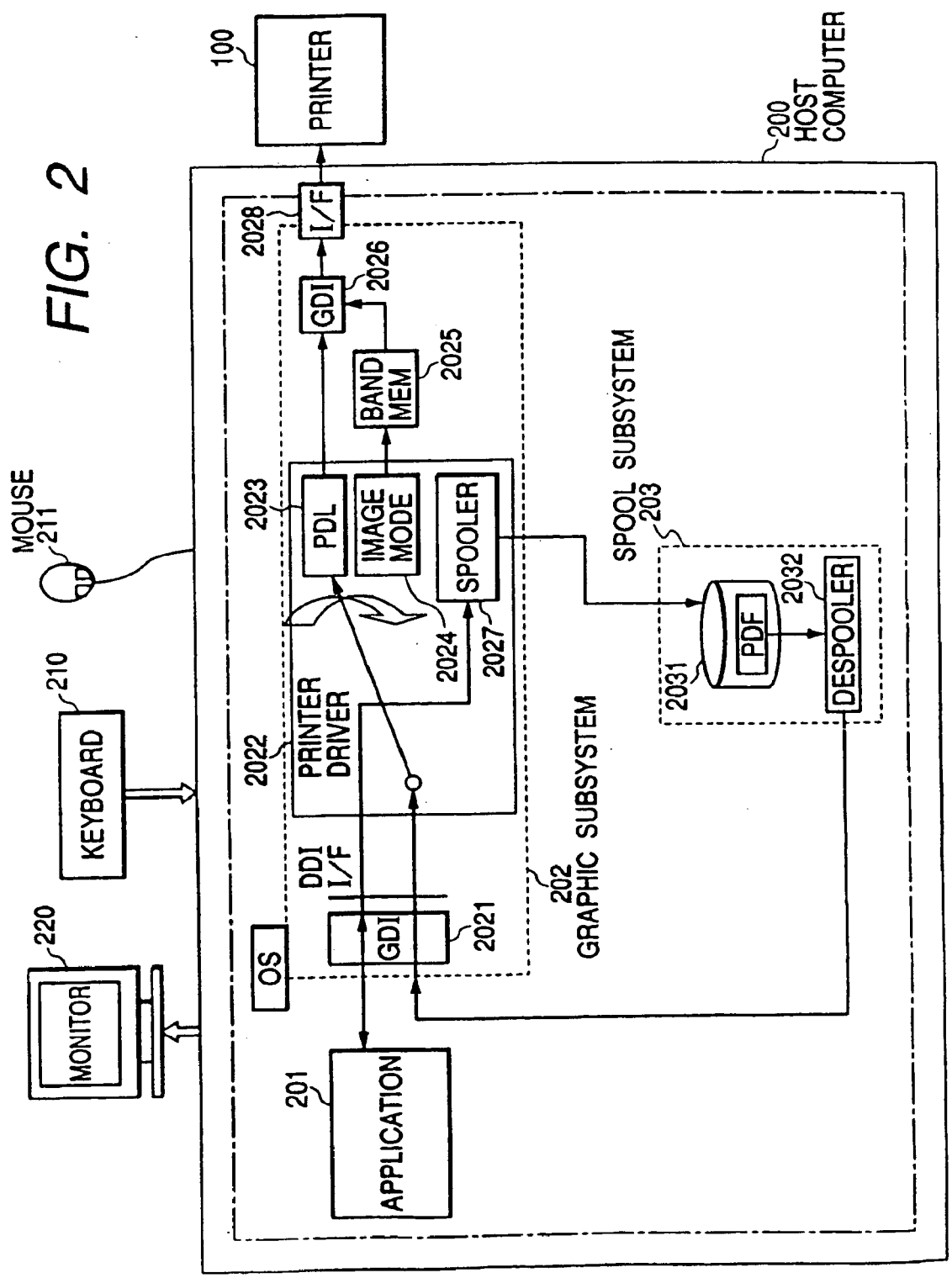

FIG. 4

| | DATA SIZE | PROCESSING SPEED | OTHERS |
|---|---|---|---|
| PDL | · MIN FOR NORMAL PAGE<br>· NO LIMITATIONS | · HIGH FOR NORMAL PAGE<br>· LOW FOR COMPLICATED GRAPHICS | SHORTCOMINGS IN LOGICAL OPERATION |
| DEVICE IMAGE | · PROPORTIONAL TO DRAW AREA<br>· MAX FIXED | · HIGH<br>· LOW ENGINE SPEED FOR SIMPLE FIGS. & CHRS | SHORTCOMINGS IN LOGICAL OPERATION |
| RGB24 IMAGE | · PROPORTIONAL TO DRAW AREA<br>· MAX FIXED | LOW | LOGICAL OPERATION OK |

FIG. 11
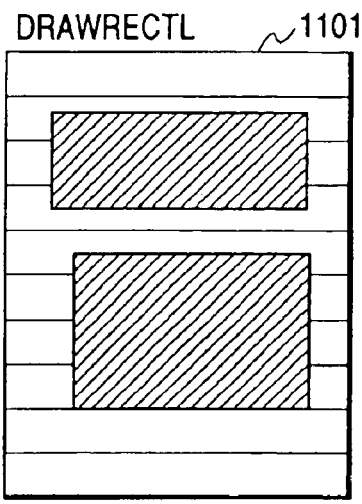
DRAWRECTL 1101
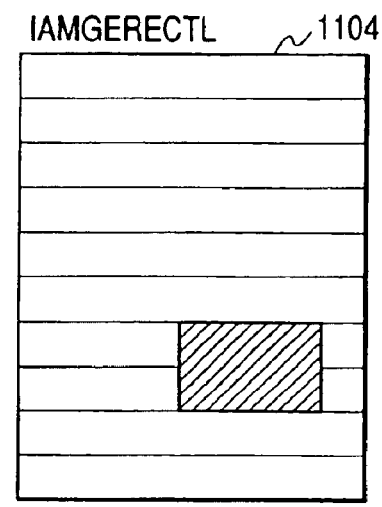
IAMGERECTL 1104
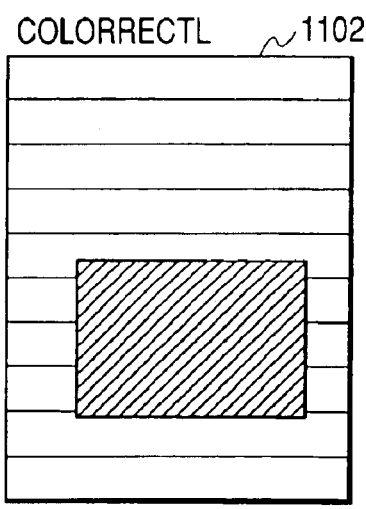
COLORRECTL 1102
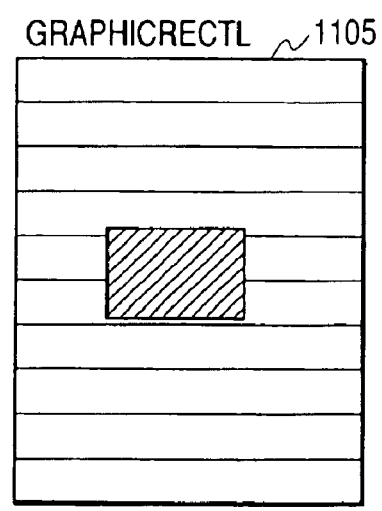
GRAPHICRECTL 1105
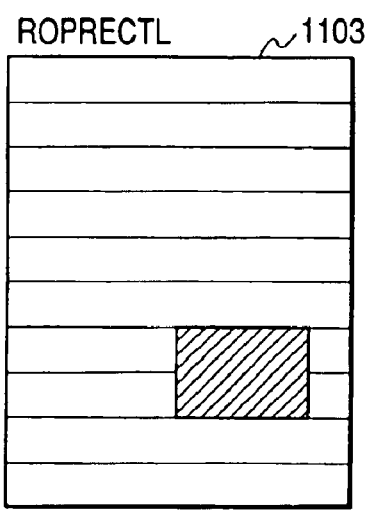
ROPRECTL 1103
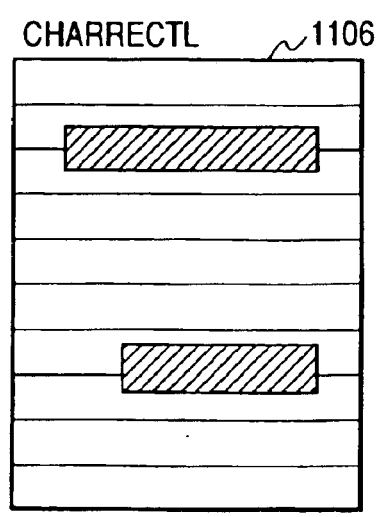
CHARRECTL 1106

INFORMATION PROCESSING APPARATUS, INFORMATION PROCESSING METHOD, STORAGE MEDIUM, AND PROGRAM

BACKGROUND OF THE INVENTION

1. Field of the Invention

The invention relates to an information processing apparatus, an information processing method, and a storage medium for converting print data from a predetermined application program into a data format which can be processed by a printer and outputting the converted data to the printer.

2. Related Background Art

A print control method and a flow of processes in a conventional print system will now be described with reference to FIG. 2.

Generally, a print system is constructed by connecting a host computer and a printer through parallel communicating means or network communicating means such as a Centronics interface as shown in FIG. 2.

On the host computer side, application software 201 (hereinafter, abbreviated to "application") such as word processor or spreadsheet operates on what is called basic software like Windows (registered trademark of Microsoft Corporation of U.S.A.). In case of printing in such an application, the printing is performed by using a function of a graphic subsystem 202 among several subsystems which are provided from such a program by the basic software. For example, in Windows, the graphic subsystem is called GDI (Graphic Device Interface: 2021) and processes image information for a display or a printer. The GDI (2021) dynamically links a module called a device driver in order to absorb dependency of each device such as display or printer and performs an outputting process for each device. Such a module for the printer is called a printer driver 2022. In the printer driver 2022, it is necessary to prepare a function group called DDI (Device Driver Interface) which has been predetermined to be installed in a device driver in accordance with its ability, function, or the like. The GDI (2021) converts an API (Application Programming Interface) call of the application into data for the device driver. The DDI function group is properly called from the GDI (2021) and a predetermined printing process is executed. The GDI (2021) sequentially processes a printing request from the application via the printer driver as mentioned above.

A processing system of the printer driver can be mainly classified into two kinds of a PDL mode type (2023) and an image mode type (2024 to 2026).

The PDL mode type is provided in the case where a controller which processes code data comprising a character code, a figure command, a control command, and the like called PDL (Printer Description Language) and can generate image data is installed on the printer side. The printer driver converts data that is handed from the system through the DDI into a command of the PDL and immediately transmits it to the printer through a GDI (2028).

Since the process of the printer driver merely generates the command from the data received by the DDI, it is a light process for the driver. As a feature of the PDL mode type, if an ability of the printer to analyze the PDL command is high, the printer receives data of a high abstraction degree from the GDI and can transmit it as it is. Therefore, a size of data to be transmitted can be reduced in the normal page printing.

In the image mode type, a print image is developed on a memory space assured on the printer driver side lest an advanced drawing process is performed on the printer side, the developed print image is converted into a format which can be directly printed by the printer, and the converted image data is sent to the printer and printed.

In a manner similar to the PDL mode type, the printer driver for the image mode (2024 to 2026) uses the data handed from the GDI via the DDI interface and performs a drawing process into the band memory 2025 and transmits the bitmap data to the printer through the GDI (2028) when the drawing process of one band is finished.

In both cases, it is necessary to perform the drawing process on the band memory or on the memory space of a full page by the printer or host machine.

However, in a color printer, if it is intended to assure a memory of 600 dpi and an A4 full page by eight bits for each color of RGB, a memory capacity of 96 Mbytes is necessary and it is difficult to assure it by any of the host machine and the printer in the present situation. Therefore, a method whereby the band memory is used for the drawing process of the color printer has been proposed.

According to the data format which is finally handed to the printer engine, each of concentration values indicative of a toner color of the printer such as YMCK values instead of luminance values of RGB consists of one or two bits per color. Therefore, generally, the process is performed by one or two bits per color of YMCK in both the image mode and the PDL mode in order to reduce the memory capacity. In the image mode, by sending the 1-bit or 2-bit data per color of YMCK, a transmission data size is reduced, thereby decreasing a load on the printer side.

For example, with respect to a printing process of a polygonal figure, in the PDL type, point coordinates which are bent and a line width, color information of a line, inner painting color information, and the like are transmitted as commands to the printer, and in the printer, the data is analyzed and developed into image data of an output format by using the internal memory space of one band of one or two bits per color of YMCK. According to the PDL system, there is such a possibility that the print data is infinitely generated in one page, and the print data which is outputted by a recent application is increasing more and more. However, in case of printing by a banding process, since it is necessary to hold intermediate data just before the drawing of one page, it becomes a factor of reduction of a processing speed in a memory saving printer.

The image mode system exists to avoid such a problem. The printer driver side which operates on the host machine having a sufficient memory construction as compared with that of the printer has a drawing memory of a band unit or a full page and develops a polygon into the drawing memory. When the drawing process of one band or full page is finished, the contents in the drawing memory are transmitted as image data to the printer, so that a predetermined image is printed and outputted.

As mentioned above, in both PDL mode and image mode, the drawing process is performed on the device dependent color space in a manner like one or two bits per color of YMCK in order to save the memory capacity. However, since a logical operation drawing process specified by the GDI is a process on a luminance space, an improper drawing sometimes occurs. To avoid it, the YMCK values are returned to the RGB values and a (inverse UCR (Under Color Remove) process) logical calculating process is performed. However, not only the perfect drawing process is not guaranteed but also it becomes a cause of reduction of the processing speed.

Therefore, the user ordinarily performs the drawing process in the PDL mode and if it takes time to output, the operating mode is switched to the high speed image mode (image mode of one bit per color of YMCK) and the data is outputted again. If an improper output result is obtained, the data is outputted again in an RGB 24 BPP image mode. In this manner, the user has to perform the operation two or more times.

That is, the user has to select the print mode in the present situation and the optimum mode cannot be known unless the data is printed in all of the modes. If pages of different types are included in a multipage printing mode, a problem such that it takes a long output time in one mode or an improper output page is mixed occurs.

The above features of the respective modes are summarized in FIG. 4.

To solve the problems, a system for automatically switching the mode so that only the favorite data of each system flows is demanded.

(1) In the print data format (PDL mode) having a high abstraction degree, there is a case where a transmission data size and a data size to be held in the printer increases and the processing speed of the printer decreases.

(2) In the print data format (PDL mode) having a high abstraction degree, if complicated figures are concentrated, a drawing speed is slower than a paper discharging speed of the printer, so that a banding process is impossible. Since the data enters a special path, there is a case where the processing speed decreases.

(3) In the processing system (normal PDL mode, high speed image mode) for performing the drawing process in the memory space of 1 or 2 bits per color of YMCK in order to save the memory capacity, there is a case where a logical operating process presuming a luminance space becomes improper.

(4) In the print data format (image mode processing) having a low abstraction degree, even in case of a page comprising only simple characters or figures, the image data that is proportional to a draw area is transmitted to the printer. Therefore, the maximum throughput of an engine cannot be derived.

(5) In the multipage printing mode, it is difficult to print to all pages in the optimum mode.

SUMMARY OF THE INVENTION

The items (1) to (4) among the above subjects are the features of the processing systems and cannot be said to be drawbacks. The present invention intends to improve the whole system by supplementing the disadvantages of the other processing systems with the advantages of the processing systems.

That is, it is an object of the invention to select optimum converting means in accordance with the print data and print at a high speed.

Another object of the invention is to perform an N-up printing at a high speed.

To accomplish the above objects, according to a preferred aspect of the invention, there is provided an information processing apparatus comprising:

first converting means for converting print data into image data;

second converting means for converting the print data into code data for allowing a printer to generate the image data;

predicting means for predicting a printing time using the image data converted by the first converting means and a printing time using the code data converted by the second converting means;

discriminating means for discriminating whether the printing time using the image data is shorter than the printing time using the code data or not on the basis of a prediction result by the predicting means; and selecting means for selecting the first converting means when it is determined by the discriminating means that the printing time using the image data is shorter and selecting the second converting means when it is determined by the discriminating means that the printing time using the image data is not shorter.

According to another aspect of the invention, there is provided an information processing apparatus comprising:

first converting means for converting print data into image data;

second converting means for converting the print data into code data for allowing a printer to generate the image data; and selecting means for selecting either the first converting means or the second converting means on a logical page unit basis.

According to still another aspect of the invention, there is provided an information processing apparatus comprising:

means for displaying a setting picture plane for allowing one of an auto mode, an image mode, and a PDL mode to be set; and transmitting means for selecting a renderer in accordance with the mode set by the setting picture plane, converting print data by using the selected renderer, and transmitting the converted print data to a printer.

BRIEF DESCRIPTION OF THE DRAWINGS

FIG. 2 is a conceptual diagram showing a conventional drawing method;

FIG. 4 is a diagram showing a feature of each mode;

FIG. 11 is a schematic diagram for explaining a virtual band for holding a result checked at the time of the spooling;

DETAILED DESCRIPTION OF THE PREFERRED EMBODIMENTS

Prior to explaining a construction of the embodiment, a structure of a color laser beam printer (hereinafter, referred to as a "color LBP") for performing the printing of a print system to which the embodiment is applied will be first described with reference to FIG. 1.

Figure 1:
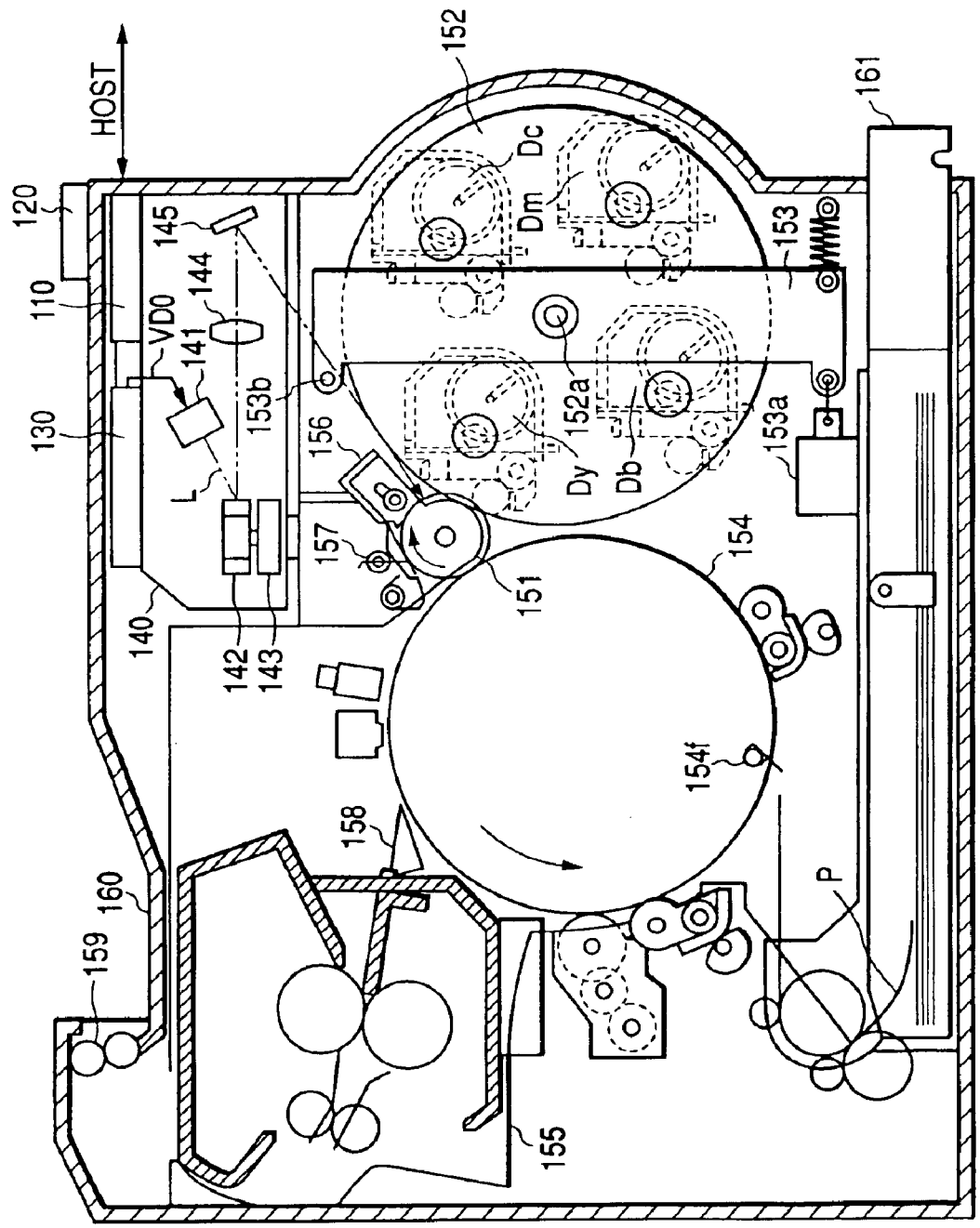
FIG. 1 is a side sectional view showing a structure of a laser beam color printer to which an embodiment of the invention can be applied.

FIG. 1 is a side sectional view showing the structure of a color LBP for recording an image on the basis of multivalue data which has a resolution of 600 dots per inch (dpi) and in which each pixel of each color component is expressed by 8 bits. In FIG. 1, reference numeral 100 denotes a color LBP main body serving as an apparatus for inputting and storing print data comprising print data (character codes, image data, etc.) and control codes which are supplied from a host computer or the like connected to the outside of the LBP, generating corresponding character patterns, images, or the like in accordance with those information, and forming an image onto a recording paper as a storage medium.

Reference numeral 110 denotes a format controller for analyzing the print data which is supplied from the host computer, generating a print image, and controlling the color LBP main body 100. The format controller 110 is connected to an operation panel 120 on which switches, an LED display, and the like for allowing the user to operate and notifying the user of a status of the LBP have been arranged. The operation panel is arranged as a part of an outer casing of the printer 100. The final print image generated by the format controller 110 is transmitted as a video signal to an output controller 130. The output controller 130 receives status information from various sensors (not shown) of the printer 100, outputs control signals to an optical unit 140 and various driving system mechanism portions, thereby controlling a printing process as a printer 100.

In the printer shown in FIG. 1, a front edge of a paper P fed from a paper feed cassette 161 is gripped by a gripper 154f and the paper is held around an outer periphery of a transfer drum 154. A latent image of each color formed on a photosensitive drum 151 by the optical unit 140 is developed by each of color developing devices Dy, Dm, Dc, and Db of yellow (Y), magenta (M), cyan (C), and black (B) and transferred onto the paper wrapped around the transfer drum a plurality of number of times, so that a multicolor image is formed. After that, the paper P is separated from the transfer drum 154, fixed by a fixing unit 155, and ejected from a paper discharging portion 159 to a paper discharge tray 160. Each of the developing devices Dy, Dm, DC, and Db of the respective colors has rotary spindles at both ends and is held to a developer selecting mechanism 152 so as to be rotatable around the spindle as a rotational center. Thus, each of the developing devices Dy, Dc, Db, and Dm has such a construction that even if the developer selecting mechanism 152 rotates around a rotary shaft 152a as a center in order to select the developing device as shown in FIG. 1, its position can be maintained to be constant. After the selected developing device was moved to a developing position, a selecting mechanism holding frame 153 is pulled toward the photosensitive drum 151 by a solenoid 153a around a fulcrum 153b as a center, so that the developer selecting mechanism 152 is moved toward the photosensitive drum 151 together with the developing devices, thereby performing a developing process. Subsequently, the photosensitive drum 151 is uniformly charged to a predetermined polarity by a charging device 156. Print information developed as an image in the format controller 110 is converted into a video signal of a corresponding pattern and is outputted to a laser driver and drives a semiconductor laser 141. A laser beam which is emitted from the semiconductor laser 141 is on/off controlled in accordance with the inputted video signal and is further swung right and left by a polygon mirror 142 which is rotated at a high speed by a scanner motor 143 and scans and exposes on the photosensitive drum 151 through a polygon lens 134 and a reflecting mirror 144. Thus, an electrostatic latent image of the image pattern is formed on the photosensitive drum 151. Subsequently, for example, the electrostatic latent image of M (magenta) color is developed by the developing device Dm of M (magenta) color and a first toner image of M (magenta) color is formed on the photosensitive drum 151. On the other hand, the transfer paper P is fed at a predetermined timing, a transfer bias voltage of an opposite polarity (for example, plus polarity) of that of the toner is applied to the transfer drum 154, the first toner image on the photosensitive drum 151 is transferred onto the transfer paper P, and the transfer paper P is electrostatically adsorbed to the surface of the transfer drum 154. After that, the toner of M (magenta) color remaining on the photosensitive drum 151 is removed by a cleaner 157, thereby preparing for a step of forming and developing a latent image of the next color. The toner images of the second, third, and fourth colors are sequentially transferred in the order of C (cyan), Y (yellow), and Bk (black) by a similar procedure. However, the transfer in this case differs from that of M (magenta) color with respect to a point that a bias voltage higher than that of the previous time is applied to the transfer drum 154 at the time of the subsequent transfer of each of the next colors. When a front edge portion of the transfer paper P on which the toner images of four colors have been multiplexed and transferred approaches a separating position, a separating claw 158 approaches and its front edge is come into contact with the surface of the transfer drum 154, thereby separating the transfer paper P from the transfer drum 154. The separated transfer paper P is conveyed to the fixing unit 155. The toner image on the transfer paper is fixed by the fixing unit and the resultant paper is ejected onto the paper discharge tray 160. The color laser beam printer in the embodiment outputs an image at the resolution of 600 dots per inch (dpi) by the image forming step as mentioned above. The printer to which the invention can be applied is not limited to the color LBP but can be applied to another color printer of another print system such as ink jet printer, thermal printer, or the like.

Figure 3A:
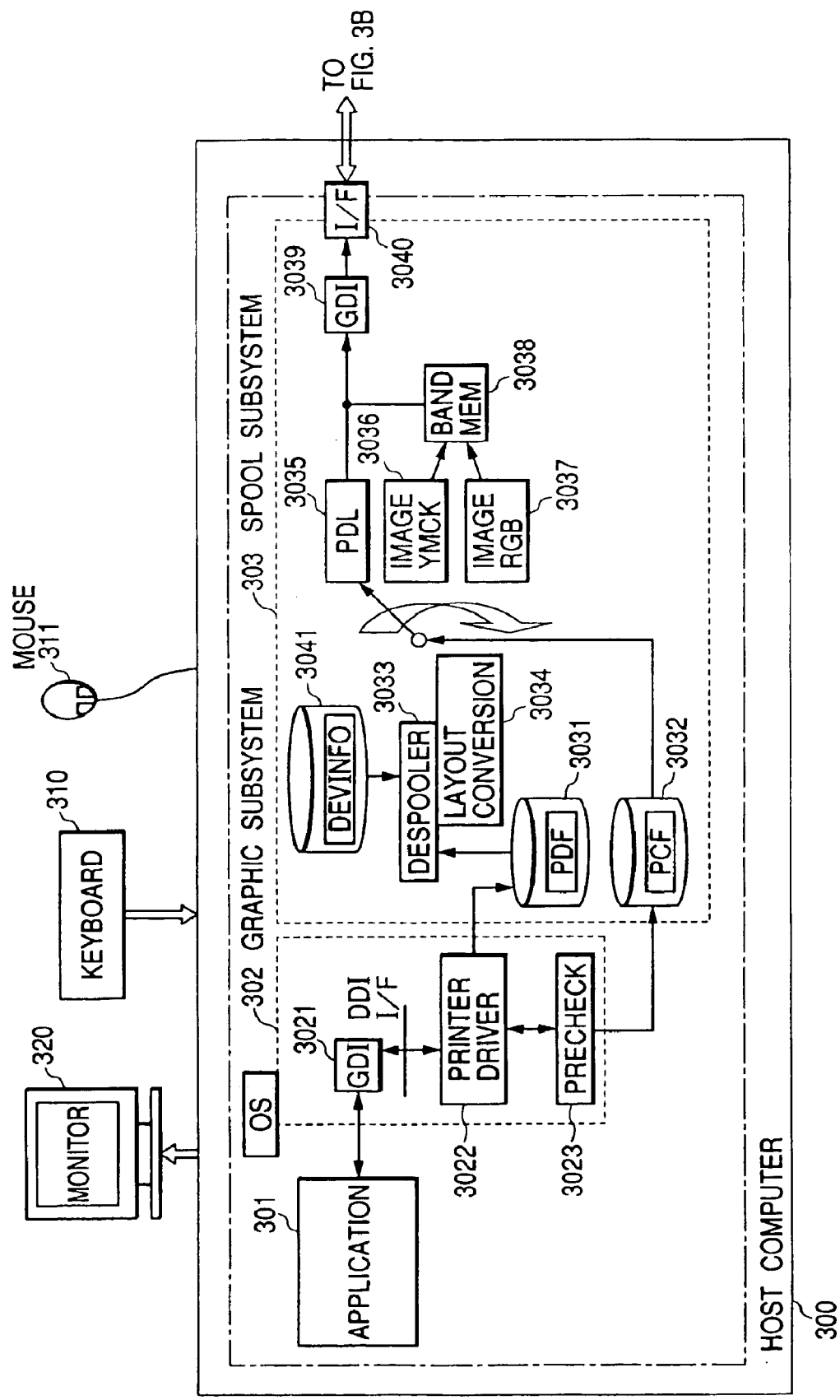
FIGS. 3A and 3B are block diagrams showing a basic construction of a whole print system according to the embodiment of the invention.
Figure 3B:
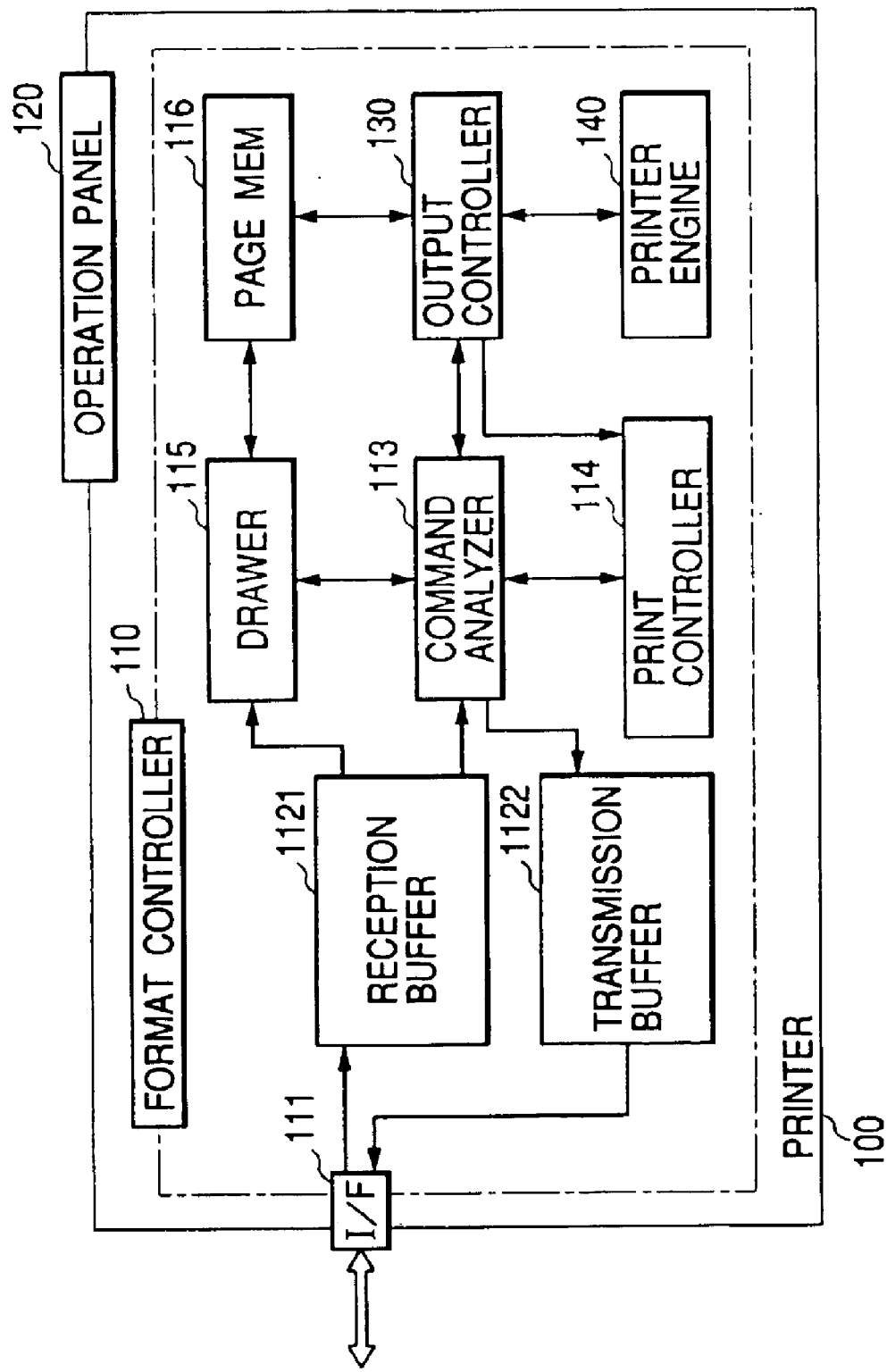

The format controller 110 in the printer 100 will now be described with reference to FIGS. 3A and 3B. Usually, the format controller is a portion which is also called a PDL controller or the like and comprises: an interface (I/F) 111 as connecting means with the host computer; a reception buffer 1121 for temporarily holding and managing the reception data or the like; a transmission buffer 1122 for temporarily holding and managing the transmission data or the like; a command analyzer 113 for analyzing the print data; a print controller 114; a drawer 115; a page memory 116; and the like.

The interface (I/F) 111 is communicating means for transmitting and receiving the print data to/from a host computer 200 and enables communication which conforms with IEEE-1284 as a communication protocol. The invention, however, is not limited to such communicating means but can be applied to a connection by various protocols through a network or to communicating means which conforms with IEEE-1394. The print data received through the I/F 111 is successively accumulated in the reception buffer 1121 as memory means for temporarily holding the data and is read out and processed as necessary by the command analyzer 113 or drawer 115. The command analyzer 113 is constructed by a control program according to each PDL command system or a print job control language. As for an analysis result of the print data regarding the drawing of character printing, figure, image, or the like, the command analyzer gives an instruction to the drawer 115 and processes such an analysis result. As for a command such as paper feed selection command, reset command, or the like other than the draw command, the command analyzer gives an instruction to the print controller 114 and processes such a command.

The drawer 115 is a renderer for successively developing each drawing object such as characters or image into the page memory 116. Although it is necessary to area-sequentially (of MCYK) transmit device dependent bitmap data to the color LBP mentioned in FIG. 1, the whole memory necessary for such a purpose is not always assured in the normal state but a memory is assured as a band area of a fraction of an integer of one plane (1, 2, or 4 bits/pixel), the band area is efficiently used, and the image is processed synchronously with the engine speed. Usually, the page memory 116 is managed by the chase of the developing process by the YMCK renderer and the shipping of the video signal to a printer engine as mentioned above, namely, by a banding control. However, if there is a sufficient memory capacity, an area in which the data of one page can be developed can be also assured. Generally, the format controller 110 is constructed by a computer system using a central processing unit (CPU), a read only memory (ROM), a random access memory (RAM), and the like. The processes in each section can be executed on a multitask monitor (real-time OS) in a time-sharing manner or can be also independently executed by preparing dedicated controller hardware every function.

The operation panel 120 is used to set and display various statuses of the printer as mentioned above. The output controller 130 converts the contents in the page memory 116 into the video signal and transmits an image to a printer engine 150. The printer engine 150 is a print mechanism for permanently forming a visible image onto the recording paper on the basis of the received video signal and has already been mentioned in FIG. 1. The printer 100 has been described above. A whole construction of the print system in the embodiment including a host computer 300 will now be described. In FIGS. 3A and 3B, reference numeral 300 denotes a host computer for outputting the print information comprising the print data and control codes to the printer 100. The host computer 300 is constructed as one computer system comprising: a keyboard 310 as an input device; a mouse 311 as a pointing device; and a display monitor (hereinafter, simply referred to as a monitor) 320 as a display device. It is assumed that the host computer 300 operates on the basis of the basic OS such as Windows NT or the like.

On the host computer side, when the functions on the basic OS are largely classified by paying attention only to the functional portions regarding the invention, they are mainly classified into: application software 301; a graphic subsystem 302; and a spool subsystem 303 including communicating means with print information storing means and the printer.

The application software 301 indicates, for example, application software such as word processor, spreadsheet, or the like which operates on the basic software. The graphic subsystem 302 comprises: a Graphic Device Interface (hereinafter, referred to as a GDI) 3021 as a part of the functions of the basic OS; and a printer driver 3022 as a device driver which is dynamically linked from the GDI.

The printer driver 3022 is called from the GDI through an interface called DDI (Device Driver Interface) and executes a process according to the device every drawing object. In the system, information handed to a DDI function is spooled as PDF (Page Data File) 3031 on a page unit basis. However, in this instance, by calling a PreCheck module 3023 as a module for checking the drawing information from the printer driver 3022, the data included in the page is analyzed. By analyzing the data of one page, the draw commands included in the page are classified every kind and sum-up results of the number of calling times and the data size are formed. The drawing area in the page is obtained as an outermost circumscribed rectangle. The above results are named by a name associated with the corresponding PDF 3031 through the GDI and saved as a PCF 3032 (the substance is saved on the RAM or hard disk) (precheck file).

The spool subsystem 303 is a subsystem that is peculiar to the printer device locating at the post stage of the graphic subsystem 302 and called a despooler.

By once spooling the print information, the output device can be changed upon despooling or a page layout handling a plurality of pages can be changed.

Further, in the embodiment, device information 3041 in which a processing speed of the output device of each draw command, a command by which an improper printing occurs, and the like have been disclosed, environmental information (vacant disk capacity, communicating speed)of the host machine, and the PCF 3032 as a check result of a page unit generated upon spooling are read out, and a translator (3035, 3036, or 3037) adapted to output is determined on a unit basis of the page, band, or matrix.

The selection of the translator suitable to print denotes that the translator which changes depending on an automatic switching policy of the mode, for example, if the priority is given to the high speed printing, the translator which can process at a high speed is selected, and if the priority is given to a picture quality, a processing system whose processing speed is as high as possible on the assumption that no improper printing occurs is selected. In case of an image mode processing (3034 to 3037), the selected translator (3035 to 3037) develops the image by using a band memory 3038 and generates a PDL command of a device dependent bitmap format. In case of a PDL mode processing (3034), the selected translator converts the spool file into the PDL command. The generated PDL command allows the data to be transmitted to the printer via a GDI (3039) and an I/F (3040).

Although there is a case where the foregoing names and functional combinations slightly differ in dependence on the basic OS, so long as a module which can realize each technical means in the invention, the names and functional combinations are not a large problem in the invention. For example, what is called a spooler or spool file can be also realized by assembling the processes into a module called a print queue in another OS. Generally, in the host computer 300 including those functional modules, under the hardware such as central processing unit (CPU), read only memory (ROM), random access memory (RAM), hard disk drive (HDD), various input/output controllers (I/O), and the like, the software called basic software performs their controls, and under this basic software, each application software and a subsystem process operate as functional modules.

(Further detailed description of the printer driver on the host side)

To realize the invention, at least the following functions are necessary in the printer driver which operates in the host machine.

1) draw data spool process
2) check and driver switching process
3) various drivers The above functions will be described hereinbelow.

1) Draw data spool process

Figure 9:
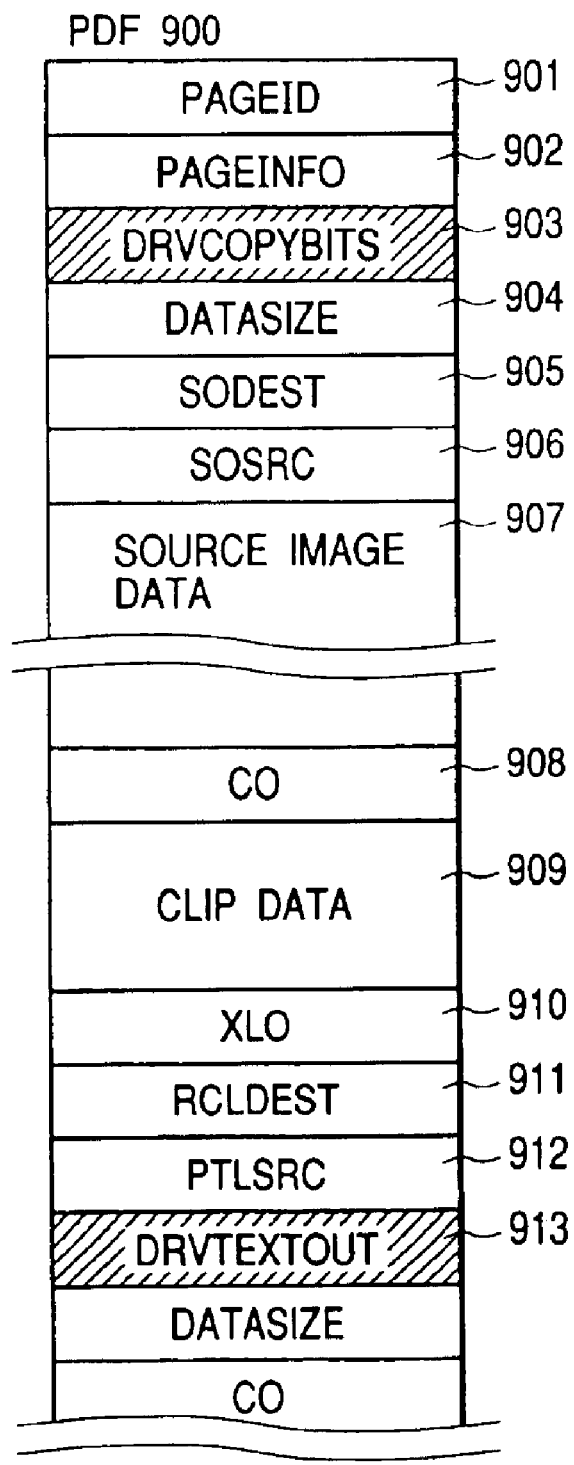
FIG. 9 is a diagram showing a structure of a PDF.

Explanation will be made with respect to Windows NT4.0 with reference to FIG. 9.

In Windows NT4.0, the following functions can be mentioned as drawing DDI functions which are called from the GDI.

DrvCopyBits( ),DrvBitBlt( ),DrvStretchBlt( ),
DrvStrokePath( ),DrvFillPath( )
DrvStrokeAndFillPath( ),DrvPaint( ),DrvTextout( )

The drawing objects are handed to those functions from the GDI through arguments.

For example, the arguments of DrvCopyBits( ) as a drawing processing function of an image are as follows.

| BOOL | DrvCopyBits( | | |
|---|---|---|---|
| | SURFOBJ | *psoDest, | //handle linked to memory of the drawing destination |
| | SURFOBJ | *psoSrc, | //handle linked to source data |
| | CLIPOBJ | *pco, | //handle of clip information |
| | XLATEOBJ | *pxlo, | //handle of color conversion information |
| | RECTL | *prclDest, | //rectangular area of drawing destination |
| | POINTL | *pptlSrc | //upper left coordinates of source data |
| | ) | | |

In the PDL mode, the clip data is first obtained from pco, clipping designation data is issued, and after that, the image draw data is generated and issued so that the source image data on the destination side shown by psoSrc and pptlSrc is drawn to the destination shown by psoDest and prclDest. In the image mode, it is sufficient to copy the image shown by psoSrc and pptlSrc to the destination shown by psoDest and prclDest only into the area shown by pco.

To realize the invention, it is necessary to determine the optimum processing mode and execute the process in this mode after the draw data of one page was detected. For this purpose, the data handed to the DDI function is once spooled and the optimum mode is decided in this instance. After it was decided, the spooled data is executed in the decided mode, so that the above process can be realized.

For this purpose, in the data which is handed to the DDI function, it is necessary to spool the data which can be processed even if the mode is determined to be any mode upon despooling.

First, it is necessary to hold the spool data on a page unit basis. Therefore, a PDF 900 holds page information (902), as a header, holding the page size, data size, the number of stored objects, and the like subsequently to pageID (901) to specify the page.

After the header, a number 903 showing the drawing function called by the DDI function is arranged. DrvCopyBits will be explained here as an example.

datasize (904): Size related to spooling of DrvCopyBits.

soDset (905): The data which can be obtained by psoDest showing surface data of the drawing destination which is handed to the DrvCopyBits( ) function is Fstored.

SoSrc (906): The data which can be obtained by psoDest showing source surface data which is handed to the DrvCopyBits( ) function is stored.

Source image data (907): The substance of source image data which can be obtained from psoSrc.

co (908): The data which can be obtained from pco showing clip data of the drawing destination which is handed to the DrvCopyBits( ) function is stored. If the clip data exists, clip data (909) is stored after that.

xlo (910): The data which can be obtained by pxol showing color conversion data which is handed to the DrvCopyBits( ) function is stored.

rclDest (911): The data which can be obtained from prcldest showing a rectangle on the surface of the drawing destination which is handed to the DrvCopyBits( ) function is stored.

ptlsrc (912): The data which can be obtained from pptlsrc showing from which position on the source surface which is handed to the DrvCopyBits( ) function the drawing is performed is stored.

After that, spools of the data that is necessary for each drawing function continue for one page.

Upon despooling, the despooler returns the data to the spooled information and hands it to the DDI function of the selected driver, so that the printer driver so far can operate in the DDI function specifications as they are.

2) Check and Driver Switching Process

Figure 10:
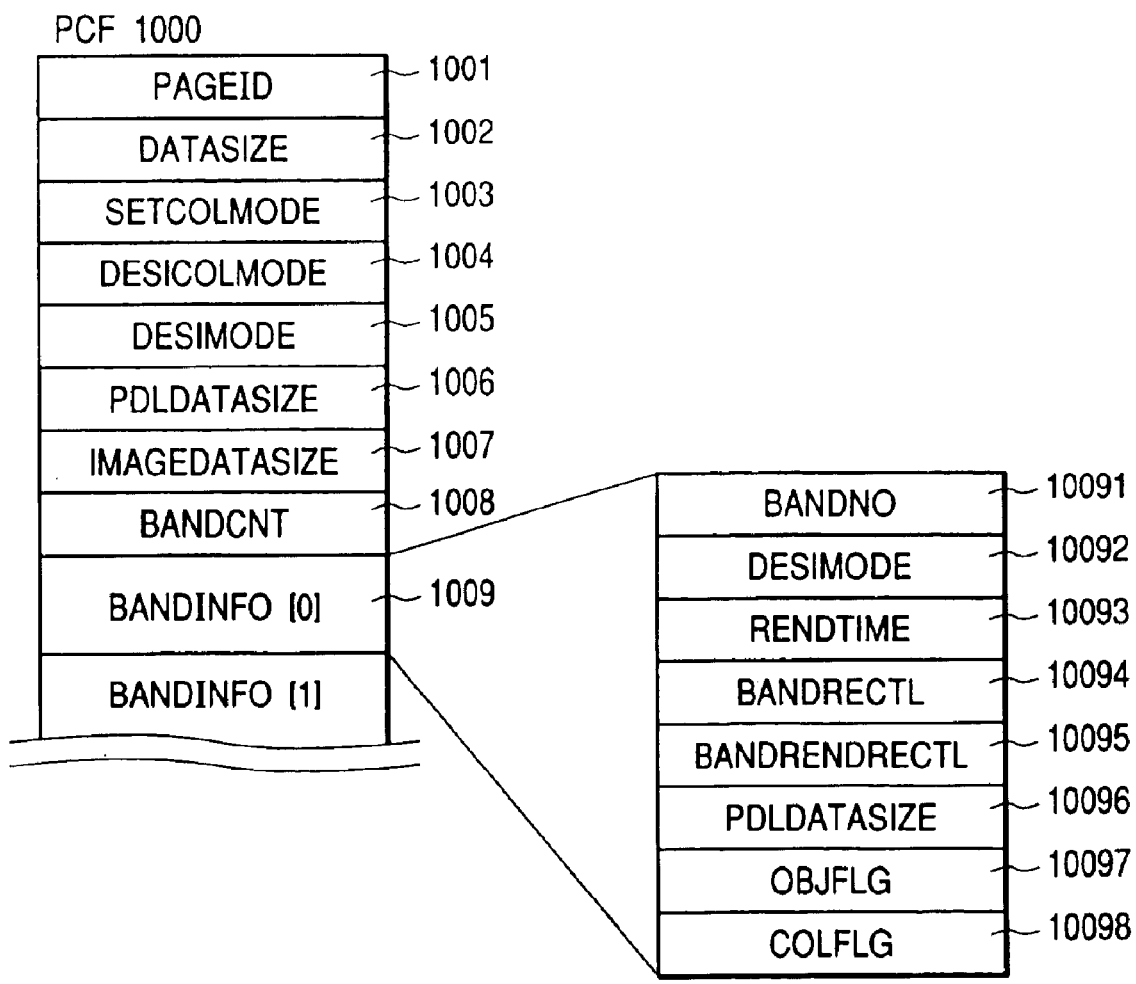
FIG. 10 is a diagram showing a structure of a PCF.

The check and driver switching means analyzes the data of the spool data by checking the following points when the draw data which is handed to the printer driver is spooled. In the embodiment, when the draw data of (1) is spooled, the data regarding the mode switching is obtained and set into a data structure like a PCF (precheck file) in FIG. 10, thereby realizing.

<1>Color Data Check

Even in case of the color printer, the check and driver switching means sets a monochromatic mode into a default status, thereby allowing the printer to operate in the color mode when at least one color data exists in the draw data. In a PCF 1000, although the set color mode is registered in 1003, a value indicative of the monochromatic mode at the time of initialization is set into desiColMode (1004) and colflg (10098) of each band information. When the draw data is spooled, if there is an object which designates a chromatic color, desiColMode (1004) and colflg (10098) of the corresponding band are reset to the color mode.

After the end of the check of the whole page, if desiColMode (1004) of the page indicates the monochromatic mode, by handling the page as a monochromatic mode, the number of rotating times of the drum is suppressed to one. Even when desiColMode (1004) of the page indicates the color mode, if colflg (10098) has been determined to be the output in the monochromatic mode and the Device image mode, by performing the drawing process to the band in the KI (2, 4) BPP image mode, the drawing process of a large band area at the same band memory size can be performed.

In the color LBP printer, the photosensitive drum 151 rotates 4 times, so that the toner of the colors of YMCK is transferred to the drum surface in the color printing mode. However, in the monochromatic mode, it rotates only once to transfer only the black toner to the drum surface. So long as a page having only monochromatic data, by operating the color LBP printer in the monochromatic mode even in the color mode, the processing speed is raised.

<2>Data Size Check

When the printer operates in the PDL mode, if "the drawing objects of one page cannot be fully stored in an internal memory", the banding process is impossible, so that the processing speed extremely decreases.

Therefore, according to the embodiment, such a drawback is avoided by predicting the data size in the printer in the PDL mode.

For this purpose, the data type and the data size in the printer when the data is sent in the PDL mode are predicted from the spool data and accumulated into PDLDataSize (1006) every page. In the embodiment, to switch the mode on a band unit basis, the page is divided on the basis of a relatively small band height which has been set for checking, and data structures to store each data of the number as many as the number of bands are provided in the PCF. (1009)

PDLDataSize (1006) of each page is divided by the associated band area and set to PDLDataSize (10096) of each band.

To obtain the data size in the case where the data is sent in the image mode, the maximum rectangular size of the drawing area of the draw data is updated to BandRendRectL of each band information. When PDLDataSize (10096) is larger than that in the case where BandRectL (10094) of the whole band area has been sent by the image data with respect to each band, it is determined to process such a band in the Device image mode (1, 2, or 4 bits per color of YMCK) and a decision result is recorded in desiMode (10092).

<3>Drawing Speed Check

In a printer in which the memory saving is realized by the banding process in the PDL mode, if there are many drawing objects in the same band, the drawing time is later than the shipping time and the drawing by the banding process becomes impossible. In the normal printer, in such a case, the data is outputted by entering a special path for getting the memory size of one page. However, if there is not a sufficient memory capacity in the printer, the compressing and decompressing processes of the image data drawn on the band memory are often executed, so that the processing speed decreases.

In the embodiment, therefore, the drawing time per unit area is predicted and, as for the area in which the drawing time is later than the shipping time, it is determined to develop the data into the data in the Device image mode (1, 2, or 4 bits per color of YMCK) and send the data to such an area, or the processes of the printer can be reduced by a method of sending the data of the whole page in the Device image mode.

In the embodiment, the data type and the drawing process prediction time in the printer at the time when the data is sent in the PDL mode are predicted in a manner similar to the case <2>and accumulated into rendTime (10093) every band corresponding to the drawing area.

As for the band in which the value of the predicted drawing time is longer than the shipping time, desiMode is set into the Device image mode (1, 2, or 4 bits per color of YMCK).

<4>Logical Operation Value Check

It is an object to equalize the drawing process in the printer with the output result on the display. For this purpose, there are many systems such that the logical operating process in an RGB space (luminance color space) used for the display or an operating process using an a channel are designated for the printer driver as they are. However, since the printer print the image by using the toner or ink, the band memory or page memory is assured by one or two bits per color of YMCK as concentration color space values and used as a drawing plane. There is, consequently, a case where the print result does not become an expected logical operation result. To avoid it, it is necessary to set the RGB24BPP image mode for performing the drawing process on the memory using a memory space of 8 or more bits per color of RGB or form an RGB rendering path in the printer.

In the embodiment, the improper drawing is avoided by switching so as to process in the RGB24BPP image mode in such a case.

In Windows NT4.0, there is a parameter of rop4 as a tenth argument of DrvBitBlt( ) and the logical operating process of source data, destination data, mask data, and brush data is designated by a value of such a parameter. This value is checked by a check system. When the number in which an improper drawing occurs if an arithmetic operation is performed by the concentration value comes, it is determined that desiMode (10092) in the band area where the object is drawn or desiMode (1005) of the page is processed in the RGB24BPP image mode.

The optimum mode can be selected by performing the checking process mentioned above every drawing object. Although the unit for the mode switching can be set to the maximum job unit or the minimum object unit, if effect of raising the speed by the mode switching is expected, at least the switching process of the page unit is necessary.

A mode deciding method of the band unit will now be described with reference to a flowchart.

The band unit used here does not indicate the band which is used for the drawing process by the printer or driver but indicates the dedicated band for use in check of the mode switching.

It is desirable that the band height size is equal to or lower than the minimum band height in the drawing process which is executed in the printer driver.

In the embodiment, the printer 100 has to be able to process the data in the case where the print data of a plurality of kinds of modes (image mode, PDL mode) is sent into one page from the printer driver.

Figure 5:
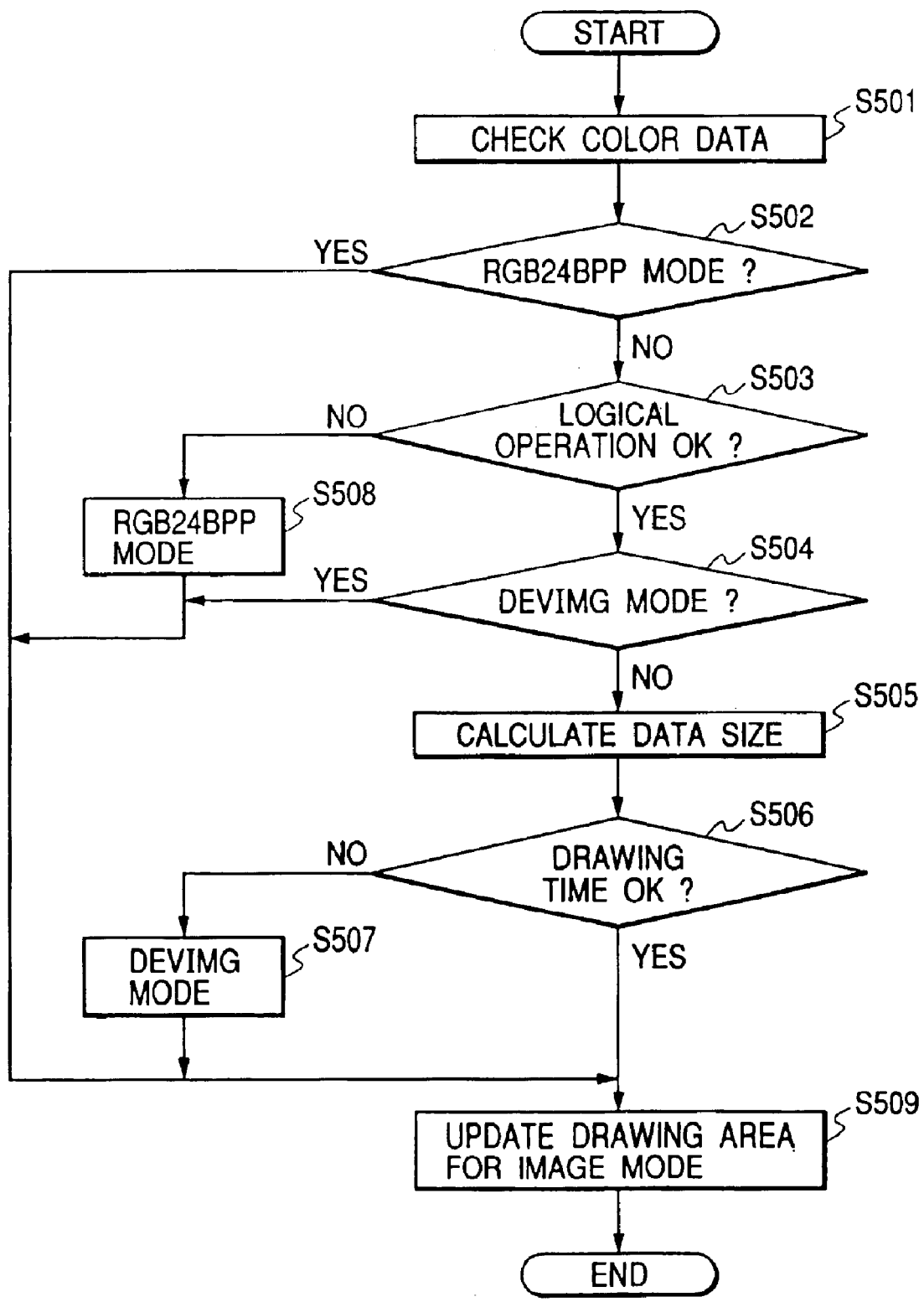
FIG. 5 is a diagram showing a flowchart showing a flow of a checking method of each object upon spooling of the invention.

FIG. 5 shows a flow of processes which are executed when the draw data is handed to the printer driver and this processing routine is executed each time the draw data is called. A program regarding the flowchart of FIG. 5 is stored in the memory of the host computer 300 and executed by the CPU.

S501: Whether color data exists in the present object or not is discriminated. If the color data exists, a color object flag of the concerned band is set to TRUE.

S502: Whether all of the bands in the range where the present object is drawn have been determined to be the RGB24BPP image mode or not is discriminated. If YES, step S509 follows. If there is another mode, step S503 follows.

S503: Whether the drawing logic of the present object is possible on the device color space or not is discriminated. If YES, step S504 follows. If NO, step S508 follows.

S508: It is determined to process the concerned band area in the RGB24BPP image mode. Step S509 follows.

S504: Whether the drawing range has been set to the Device image mode (image mode of 1, 2, or 4 bits per color of YMCK) or not is discriminated. If YES, step S509 follows. If NO (PDL mode), step S505 follows.

S505: The size of data which is generated in the printer in the case where the present object has been transmitted in the PDL mode is calculated and added to the total data size in the case where the data has been transmitted in the PDL mode. Step S506 follows.

S506: When the present object is transmitted in the PDL mode, the drawing time of the concerned band is calculated. If the accumulated drawing time with the objects so far is longer than the paper discharge time, step S507 follows. If YES, step S509 follows.

S507: The band area where the accumulated drawing time is longer than the paper discharge time is determined to be the Device image mode. In step S507, the image mode is set to one of the 1-bit mode, 2-bit mode, and 4-bit mode of YMCK on the basis of the setting of the user. Step S509 follows.

S509: When the data is sent in the image mode, the drawing area of the concerned band is updated.

Figure 6:
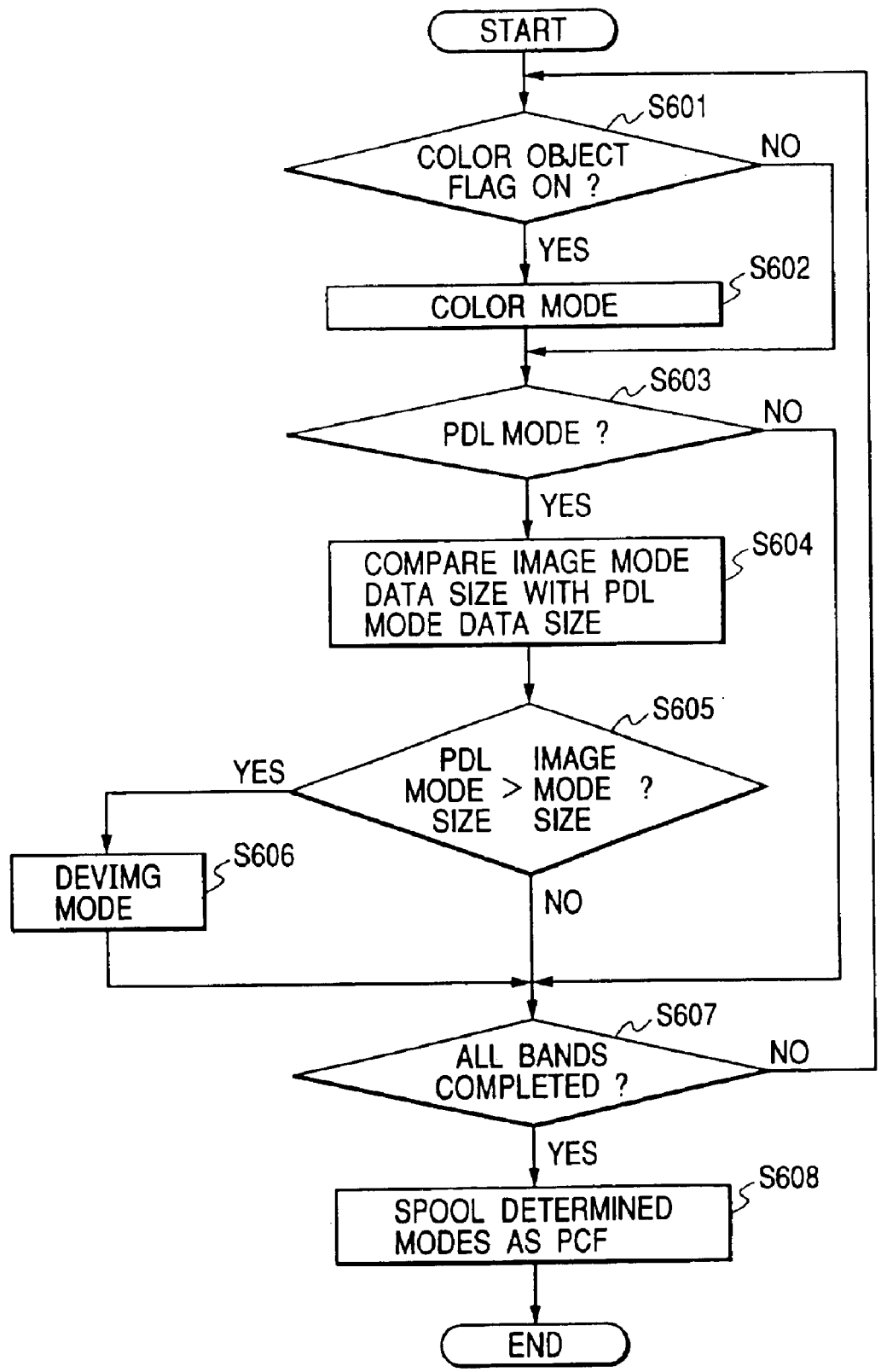
FIG. 6 is a diagram showing a flowchart showing a flow after the end of checks of all objects of a page upon spooling of the invention.

The processes after completion of the spooling processes and the checking processes of all objects of one page will now be descried with reference to a flowchart of FIG. 6. A program regarding the flowchart of FIG. 6 is stored in the memory of the host computer 300 and executed by the CPU.

S601: Whether a color object flag of the checking band in 700 in FIG. 7 has been set to "1" or not is discriminated. If YES, step S602 follows. If NO, step S603 follows.

S602: The present page is set to the color mode. Step S603 follows.

S603: Whether the present band has been set to the PDL mode or not is discriminated. If YES, step S604 follows. If NO, step S607 follows.

S604: The data size in the printer in the case where the data has been sent in the image mode is compared with that in the case where the data has been sent in the PDL mode. If the data size in the case where the data is sent in the PDL mode is larger, step S606 follows. If the data size in the case where the data is sent in the image mode is larger, step S607 follows.

S606: The present band is set to the Device image mode. In step S606, the image mode is set to one of the YMCK 1-bit mode, 2-bit mode, and 4-bit mode on the basis of the setting of the user. Step S607 follows.

S607: Whether the processes of all bands of the present page have been completed or not is discriminated. If YES, step S608 follows. If NO, step S601 follows.

S608: The modes determined with respect to all bands of the present page are linked to the page ID and spooled as a precheck file (PCF).

3) Finally, the drawing process which is executed by various drivers in accordance with the determined mode will be explained with reference to FIG. 7.

It is assumed that by checking the page of 700 in the item (2), a decision is made as shown in 710. Band delimiters of 700 and 710 are virtual bands for checking.

Reference numeral 701 denotes image data of a high resolution. If it is converted into a PDL command in a state of a value of 8 bits per color of RGB, a data capacity becomes tens of Mbytes. Therefore, the second and third bands are determined to draw in the YMCK4BPP (one bit per color) image mode.

Reference numeral 702 denotes draw data in which an improper drawing occurs when the YMCK drawing process is performed. Therefore, the corresponding band is determined to perform the drawing process in the RGB24BPP image mode. Reference numeral 710 denotes that it is determined that there is no problem in the PDL mode with respect to the other bands.

A despooler 3033 forms band information for despooling on the basis of the virtual band data handed as mentioned above.

The band memory to process the data in the image mode is assured, the height of band which is used in each image mode is calculated from the assured band memory size, and the band height is reset. (7201, 7203)

(Even in the same memory size, the band height in the RGB24BPP image mode and that in the YMCK4BPP image mode are different.)

In the PDL mode, since the banding process is performed in the printer, the continuous PDL areas are linked by the printer driver. (7202)

Reference numeral 720 denotes a state of the band reconstructed as mentioned above.

The despooler 3033 forms a band list in accordance with the above information and calls the corresponding driver every band, thereby performing the drawing process or the converting process for converting the data into the PDL data.

The above processes will be described further in detail with reference to a flowchart of FIGS. 8A and 8B.

Figures 8, 8A:
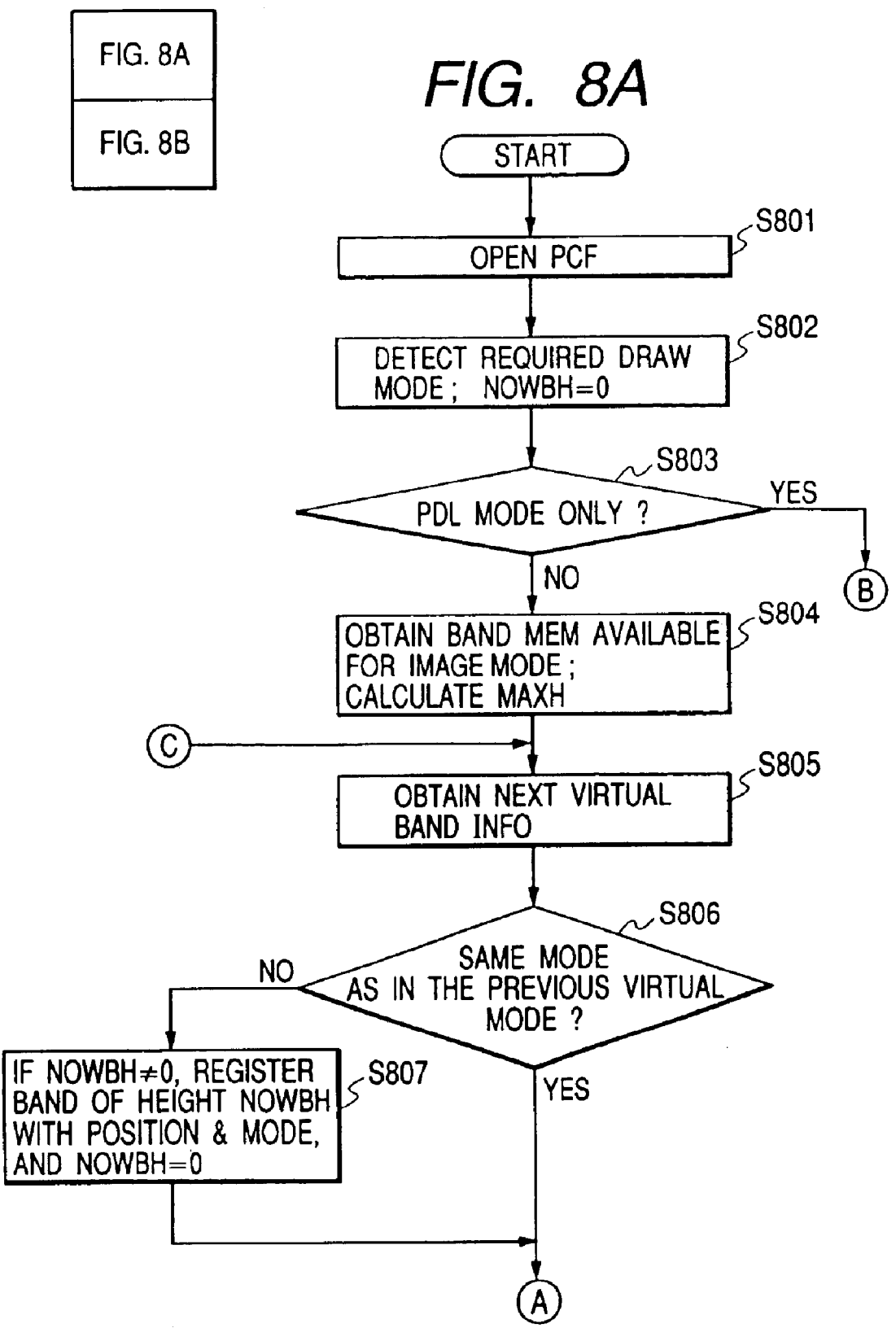
FIG. 8 which is composed of FIGS. 8A and 8B are diagrams showing a flowchart showing a flow of a process for forming a band list upon despooling of the invention.
Figure 8B:
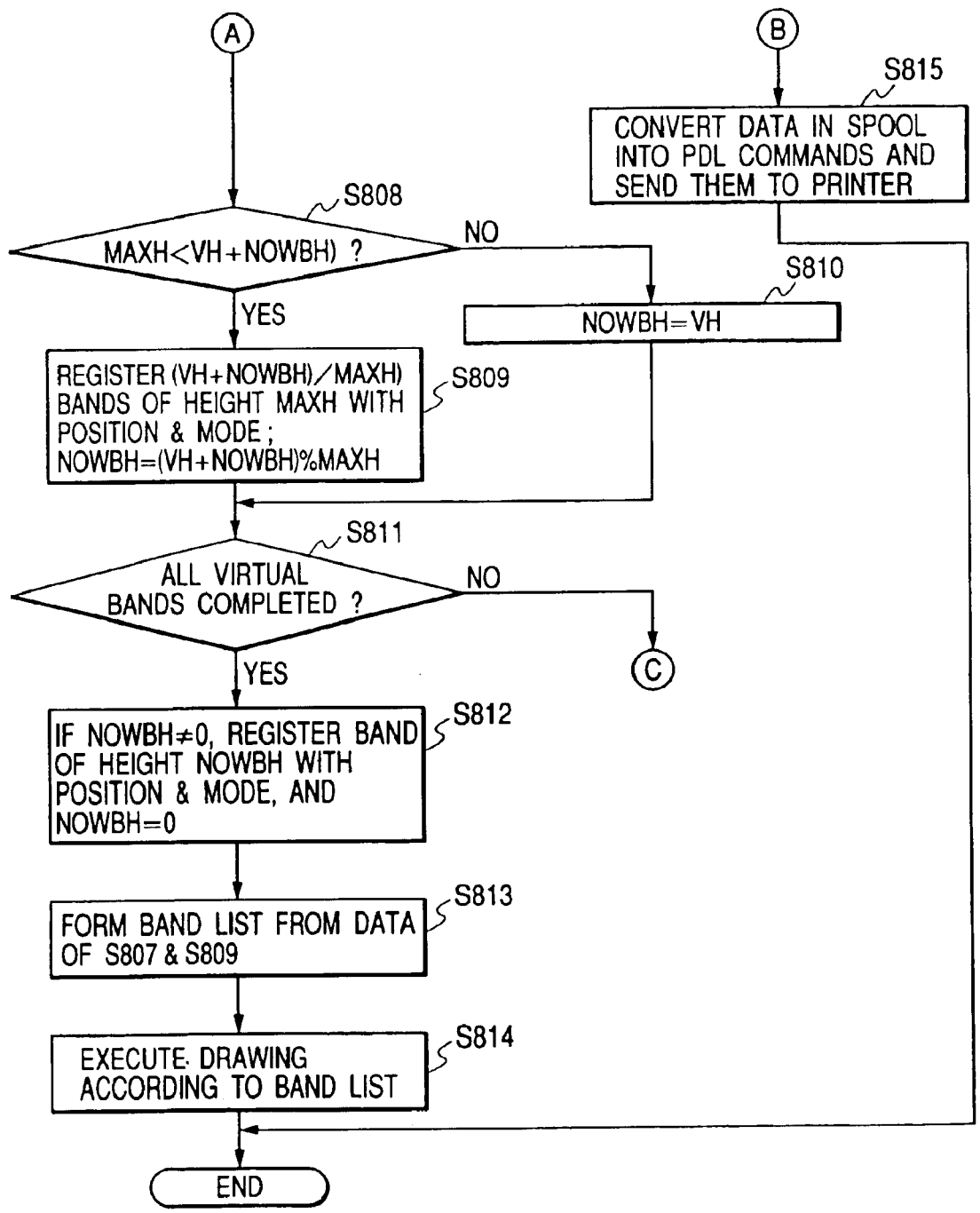

A program regarding the flowchart of FIGS. 8A and 8B is stored in the memory of the host computer 300 and executed by the CPU.

Figure 7:
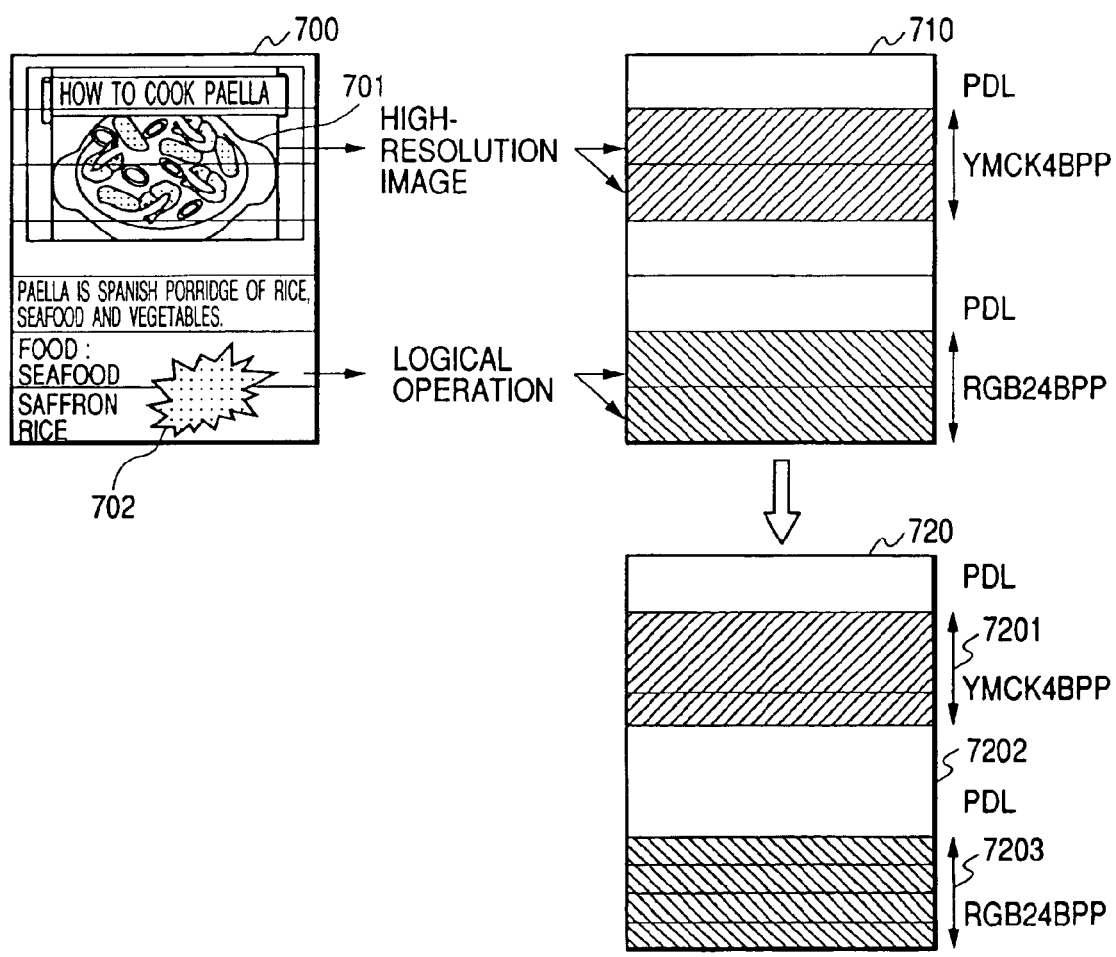
FIG. 7 is a schematic diagram showing a method of forming a band list upon despooling of the invention.

The following processes show processes in the case where the draw data of one page is spooled and, thereafter, such a page is despooled.

vH=Height of virtual band (band height shown at 710 in FIG. 7)

maxH=Maximum height which can be obtained in the case where the band memory which could be obtained is used by each renderer (upper portion of 7201 in FIG. 7 and band height shown at 7203)

nowBH=Processing band height which is being calculated at present

S801: The PCF (file in which the result checked upon spooling has been stored) corresponding to the page to be outputted is opened. Step S802 follows.

S802: The drawing mode necessary for the drawing process of the present page is detected. An initializing process of nowBH to store the band height which is being calculated at present is also performed. Step S803 follows.

S803: In case of only the PDL mode, step S813 follows. When there is the image mode, step S804 follows.

S804: The band memory which can be used as an image mode is obtained. The maximum value maxH of the band height for drawing process is obtained from the obtained band memory size, page lateral width size, and the value of bits/pixel of each mode. Step S805 follows.

S805: The next virtual band information is obtained. Step S806 follows.

S806: Whether the processing mode is the same as that of the previous virtual band or not is discriminated. If YES, step S808 follows. If NO, step S807 follows.

S807: If any value other than 0 exists in nowBH, the band of the height in nowBH is registered together with the drawing position and the drawing mode and initialized to nowBH=0. If 0 exists in nowBH, this step is skipped and step 5808 follows.

S808: If the value obtained by combining the virtual band height vH and nowBH is larger than maxH, step S809 follows. If it is smaller, step S810 follows.

S809: The virtual band space is divided into (vH+ nowBH)/maxH (integer obtained by omitting the fraction below decimal point: for example, portion of 2 of 256/100=2.56) bands of the maxH height and registered together with the drawing mode. nowBH=(vH+nowBH)% maxH (remainder portion of the division: for example, portion of 56 of 256/100=2 and remainder 56) is set. Step S811 follows.

S810: nowBH=vH. Step S805 follows.

S811: When the reading process of all of the virtual bands is finished, step S812 follows. If NO, step S805 follows.

S812: If any value other than 0 exists in nowBH, the band of the height in nowBH is registered together with the drawing position and the drawing mode and initialized to nowBH=0. If 0 exists in nowBH, the processing routine is skipped and step S813 follows.

S813: A band list is formed on the basis of the band data registered in steps S807 and S809 and the spooled draw data is linked to the band list. Step S814 follows.

S814: The drawing process or the converting process for converting the data into the PDL data is executed from the upper bands registered in the band list and the generated data is transmitted to the printer.

S815: The spooled draw data is read, converted into the PDL commands in the registering order, and transmitted to the printer.

In step S814, if the YMCK mode has been set in step S507 and the image mode of 1BPP per color of YMCK has been designated by the user, the RG824BPP image is converted into the YMCKLBPP image by a YMCK renderer 3036 and the operation, the drawing process are performed on the basis of the YMCK1BPP image, and the resultant data is outputted to the printer.

In the case where the YMCK mode has been set and the 2BPP image mode per color of YMCK has been set by the user in step S507, the RGB24BPP image is converted into the YMCK2BPP image by the YMCK renderer 3036 and the arithmetic operation and the drawing process are performed by the converted YMCK2BPP image, and the YMCK2BPP image is outputted to the printer. In the case where the YMCK mode has been set and the YMCK4BPP image mode has been set by the user in step S507, the RGB24BPP image is converted into the YMCK4BPP image by the YMCK renderer 3036 and the arithmetic operation and the drawing process are performed by the converted YMCK4BPP image, and the YMCK4BPP image is outputted to the printer. In the case where the RGB mode has been set in step S508, the arithmetic operation and the drawing process are performed in the RGB24BPP image mode by the RGB renderer 3037, the image is converted into the 1, 2, or 4 BPP image per color of YMCK designated by the user and the converted image is outputted to the printer.

S813: The spooled draw data is loaded as it is and sequentially converted into the PDL data and transmitted to the printer.

(Further detailed description on the printer side)

To realize the invention, the printer needs the following functions.

<1>Processing mode switching function of the band unit or page unit.

Among the PDL printers, there is a printer having a mode such as an image mode for receiving the device dependent image data and outputting as it is independent of the PDL mode as a default path. However, in the image mode, since the data is processed by a special memory construction in order to process a large amount of image data at a high speed, it is difficult to switch the PDL mode and the image mode by the same job.

To realize the invention, it is necessary to switch the PDL mode and the image mode on a page unit basis and, further, on a band unit basis.

In the embodiment, therefore, this problem is solved by a method whereby a port for receiving the device dependent image data is formed for the data type of the image draw data in the PDL mode.

It will be obviously understood that in order to switch the mode for performing the drawing process on a band unit basis, in the case where there are the objects to be drawn over the band, drawing algorithms also have to be matched lest a discontinuous line appears.

(Second Embodiment)

Figure 16:
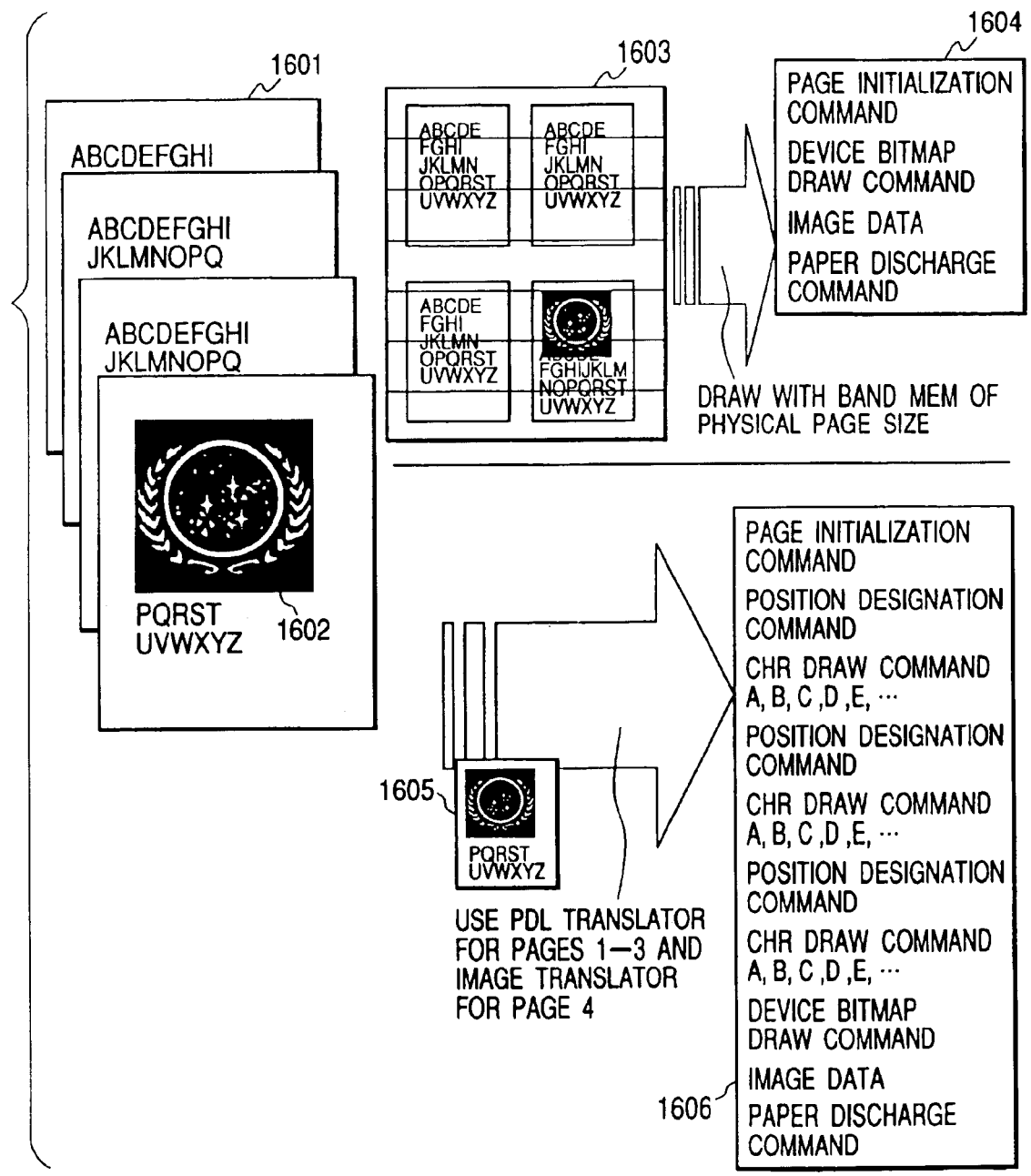
FIG. 16 is a schematic diagram of an ideal embodiment of the invention.

The second embodiment of the invention will now be described with reference to FIG. 16.

Since a case where a discontinuous line appears at a coupling portion if the image mode and the PDL mode are switched on a band unit basis is taken into consideration, an example of switching on a logical page unit basis will now be explained.

Reference numeral 1601 denotes a document of four pages formed by using a general document forming application. The first to third pages are constructed by data of only characters and are pages which can be printed at a high speed by the printer. However, image data 1602 adhered to the fourth page is a color image of a high resolution. If a multipage (4-up) on which four pages are printed to one page is processed in the PDL mode, the high resolution image is transmitted to the printer as a PDL command as it is and the processing speed of the printer remarkably deteriorates.

To avoid it, the processing system is automatically switched by using the invention. In the N-up printing mode, the following two switching methods can be mentioned.

1) They are switched on a physical page unit basis.

To process the whole physical page including the high resolution image in the image mode, the whole page is divided into several band areas (1603), the drawing process is executed on a band unit basis, and the generated device bitmap data has a size of the whole page. (in the case where the resolution is set to 600 dpi, the number of output gradations is equal to 2, the printing mode is the YMCK printing mode, and the size is set to the A4 size, the data size at the time of non-compression is equal to 32 Mbytes. Therefore, a possibility in which the data cannot be outputted by the designated number of gradations is high in dependence on the size of memory installed in the printer.)

2) They are switched on a logical page unit basis.

As for the first to third pages, only a character draw command using character codes is generated by a translator of the PDL mode system. As for the fourth page, a translator of the image mode system is selected. According to the translator of the image mode system, a band memory of the area at the time when a reducing process was performed is prepared (1605). To draw the reduced image into such a band memory, the number of times of band division and the generated device bitmap data are also reduced into ¼ of that in the case of 1). Even when the size of the installed memory is small in correspondence to it, a possibility in which the data is outputted at a high gradation by the image mode processing is high.

The invention uses the method of 2). A method of realizing such a method will now be described in detail hereinbelow.

(Further detailed description of the printer driver on the host side)

To realize the invention, at least the following functions are necessary for the printer driver which operates by the host machine.

1) Draw data spooling process

2) Checking process and drawing area holding process of each draw command upon spooling 3) Process for reading device information, output environment information, layout information, and check results before despooling 4) Process for selecting reproducing means and the number of output gradations from the check results on a logical page unit basis 5) Process for performing the despooling process by the processing system selected by the selected reproducing means every logical page and ejecting the page on a physical page unit basis Each of the above processes will be described hereinbelow.

1) Draw Data spooling process

This process will be explained with reference to FIG. 9 with respect to Windows NT4.0 as an example.

In Windows NT4.0, the following functions can be mentioned as DDI functions for drawing which are called from the GDI.

DrvCopyBits( ),DrvBitBlt( ),DrvStretchBlt( ),
DrvStrokePath( ),DrvFillPath( )
DrvStrokeAndFillPath( ),DrvPaint( ),DrvTextOut( )

The drawing objects are handed to those functions from the GDI through the arguments.

For example, the arguments of DrvCopyBits( ) as a drawing processing function of an image are as follows.

```
BOOL    DrvCopyBits(
        SURFOBJ   *psoDest,    //handle linked to memory of
                               the drawing destination
        SURFOBJ   *psoSrc,     //handle linked to source data
        CLIPOBJ   *pco,        //handle of clip information
        XLATEOBJ  *pxlo,       //handle of color conversion
                               information
        RECTL     *prclDest,   //rectangular area of drawing
                               destination
        POINTL    *pptlSrc     //upper left coordinates of
                               source data
```

In the PDL mode, the clip information is first obtained from pco, clipping designation command is issued, and after that, the image draw command is generated and issued so that the source image data on the destination side shown by psosrc and pptlSrc is drawn to the destination shown by psoDest and prclDest. In the image mode, it is sufficient to copy the image shown by psoSrc and pptlsrc to the destination shown by psoDest and prclDest only into the area shown by pco.

To realize the invention, it is necessary to determine the optimum processing mode and subsequently execute the despooling process after the draw information of one page was detected. For this purpose, the data handed to the DDI function has to be spooled in such a data format that the data can be reproduced even in any mode upon despooling in the data which is handed to the DDI function.

First, it is necessary to hold the spool data on a page unit basis. Therefore, the PDF 900 in FIG. 9 has the page information (902) to hold the page size, data size, the number of stored objects, and the like as a header subsequently to the pageID (901) for specifying the page.

After the header, the number 903 indicative of the drawing function called by the DDI function is arranged. Explanation will now be made with respect to DrvCopyBits as an example.

datasize (904): Size related to spooling of DrvCopyBits.

sodset (905): The information which can be obtained by psoDest showing surface information of the drawing destination which is handed to the DrvCopyBits( ) function is stored.

soSrc (906): The information which can be obtained by psoDest showing source surface information which is handed to the DrvCopyBits( ) function is stored.

source image data (907): The substance of source image data which can be obtained from psoSrc.

co (908): The information which can be obtained from pco showing clip information of the drawing destination which is handed to the DrvCopyBits( ) function is stored. If the clip data exists, clip data (909) is stored after that.

xlo (910): The information which can be obtained by pxol showing color conversion information which is handed to the DrvCopyBits( ) function is stored.

rclDest (911): The information which can be obtained from prclDest showing a rectangle on the surface of the drawing destination which is handed to the DrvCopyBits( ) function is stored.

ptlSrc (912): The information which can be obtained from pptlSrc showing from which position on the source surface which is handed to the DrvCopyBits( ) function the drawing is performed is stored.

After that, spools of the data that is necessary for each drawing function continue for one page.

Upon despooling, the despooler returns the data to the spooled information and hands it to the DDI function of the selected driver, so that the printer driver so far can operate in the DDI function specifications as they are.

2) Checking process and drawing area holding process of each draw command upon spooling The checking means and the drawing area holding means of each draw command upon spooling analyze the information of the spool data by checking the following points regarding the processing speed when the draw data which is handed to the printer driver is spooled. In the embodiment, when the draw command of (1) is spooled, the information regarding the mode switching is obtained, stored, and spooled into a data structure like a PCF (precheck file) 1000 in FIG. 15 on a page unit basis, thereby realizing.

The data structure of the PCF 1000 is a structure starting from a job number 1001 and a page number 1002 to which such a file belongs, and the corresponding page can be specified by those two values.

The other structure is constructed by a bandinf structure 1030 in which each of the bands obtained by dividing the page in the Y axis direction is used as a unit. As for a virtual area, the band area in which the bands of the size shown in VbandSize 1004 of the number corresponding to bandCnt 1005 are filled in the pageSize 1003 is virtually defined.

BandInfo is a structure starting from BandRectL 1010 which holds the area of the virtual band by rectangle information. This structure is a structure to record the concerned drawing processing information into the area of BandRectL 1010. The details are as follows.

A maximum circumscribed rectangular area DrawRectL 1011 of the drawing process which is drawn in the band.

A chromatic color area ColorRectL 1012 in the drawing area which is drawn in the band.

An area ROPRectL 1013 in which an improper printing occurs when the YMCK printing is performed.

A drawing processing area ImgRectL 1014 by the image system function.

A drawing area GraphicRectL 1015 by the graphic function.

A character system drawing area TextRectL 1016.

The areas shown by the above RectL structures are shown in FIG. 11 so as to be easily understood.

1101: Outermost rectangular area of the drawing area in each virtual band held in DrawRectL 1011.

1102: Outermost rectangular area of the drawing area where the drawing process is performed by the chromatic color in each virtual band held in ColorRectL 1012.

1103: Outermost rectangular area of the drawing area in each virtual band held in ROPRectL 1013.

1104: Outermost rectangular area of the drawing area of the image system in each virtual band held in ImgRectL 1014.

1105: Outermost rectangular area of the drawing area of the graphic system in each virtual band held in GraphicRectL 1015.

1106: Outermost rectangular area of the drawing area of the character system in each virtual band held in CharRectL 1016.

The outermost rectangular area of the drawing area presumed from the draw command is obtained when the draw data is spooled and the above area shows an overlap portion of the outermost rectangular area and bandRectL.

Besides them, the BandInfo structure 1030 collects the information of each DDI function into areas 1017 to 1020.

Explanation will now be made with respect to the DDI of Windows NT4.0. The information regarding a StretchBlt function as a DDI function which can designate a magnification or a contraction of a bitmap is stored in StretchBlt 1019.

The area 1019 can store the information regarding this band such as the number of calling times callcnt 10191 of the StretchBlt function, the number of 1BPP images 1BPPCnt 10192, and a total data size 1BPPTotalSize 10193 of the 1BPP image.

Each of the other DDI functions, namely, CopyBits (1017), BitBlt (1018), . . . , and Polygon (1020) also has a data structure such as to hold the information that is handed to each function I/F.

3) Process for reading device information, output environment information, layout information, and precheck results before despooling Device Information:

When the processing mode is determined from the collected information upon spooling, if the processing speeds of the graphics data, the processing speeds of the image data, or the logical operating abilities of the printers differ, there is a case where the prediction results differ. Those values are obtained every printer and stored in a file. The file is held as an installation file into the system.

Output Environment Information:

It denotes an ability (CPU speed, disk speed, disk vacant capacity) of the host machine by which the printer driver operates and a transmission speed between the printer and the host.

Layout Information:

The transmission data size in the case where the data is processed in the image mode largely changes in dependence on at which size the pagesize 1003 is actually outputted.

In case of arranging a plurality of pages to one page of the N-up designation or the like, there is a case where the pages which can be processed at a high speed in the PDL mode are collected and a load on the printer increases.

The page upon spooling is defined as a logical page and the page which is actually subjected to the drawing process upon outputting is defined as a physical page. Layout information shows at which positions in the physical page the logical pages are arranged.

Precheck Result:

It shows the PCF in which the result checked by the spooler has been stored.

The PCFs of all of the logical pages existing in the physical page are read and used as targets of the arithmetic operation.

4) Process for selecting a reproducing process and the number of output gradations from the check results on a logical page unit basis The following discriminating processes of <1>to <3>are made on a logical page unit basis and the discrimination results are held in a management table.

<1>Discrimination about color/monochromatic

In case of switching the color mode and the monochromatic mode on a logical page unit basis:

The presence or absence of a ColorRectL area (area where the drawing process of a chromatic color object was performed) of each band of the PCF is discriminated. If at least one of them exists, the relevant page is processed in the color mode.

In case of switching the processing mode on a band unit basis:

The presence or absence of a ColorRectL area (area where the drawing process of a chromatic color object was performed) of each band of the PCF is discriminated. The band in which such an area exists is processed in the color mode.

<2>Avoidance of improper printing

In case of switching the processing mode on a logical page unit basis:

The presence or absence of an ROPRectL area (area where the logical operating process by which an improper printing occurs in the YMCK color space was performed) of each band of the PCF is discriminated. If at least one of them exists, the relevant page is processed in the RGB24BPP image mode.

In case of switching the processing mode on a band unit basis:

The presence or absence of an ROPRectL area (area where the logical operating process by which an improper printing occurs in the YMCK color space was performed) of each band of the PCF is discriminated. The band where such an area exists is processed in the RGB24BPP image mode.

<3>Prediction of processing speed

Figure 12:
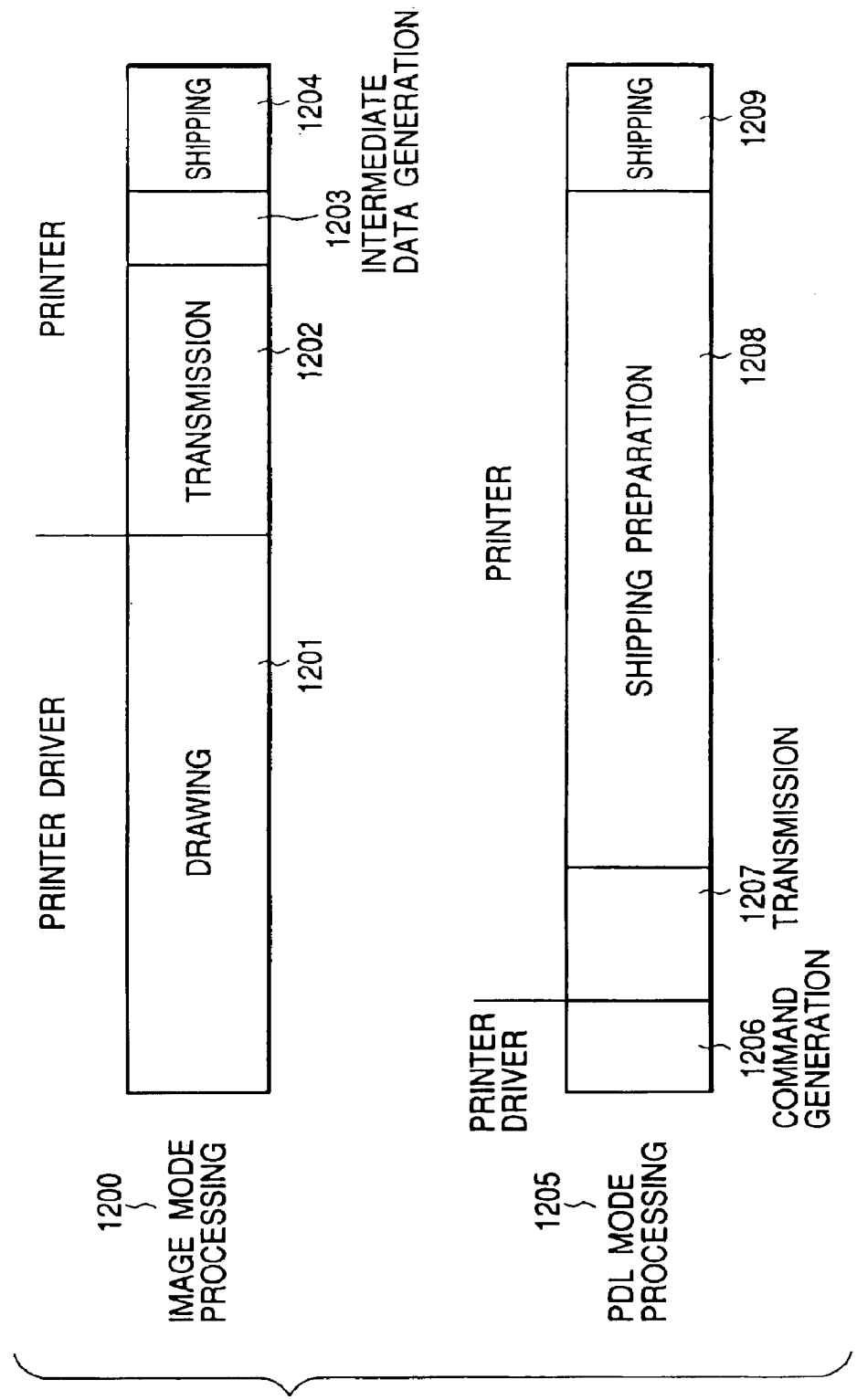
FIG. 12 is a schematic diagram showing features of processing times of an image mode processing and a PDL mode processing.

There is a relation as shown in FIG. 12 between the processing speeds in the image mode and the PDL mode.

"Prediction of image mode processing speed"

An image mode processing 1200 is mainly divided into a processing time of the printer driver and a process of the printer.

Although the process of the printer driver relates to a drawing time 1201 using the band memory, since the drawing process including a color converting process and a binarizing process is executed, it can be regarded to be a process heavier than the process of the driver in the PDL mode. The prediction value of the processing time is obtained by multiplying the drawing processing information of each drawing object by the CPU speed of the host machine and the vacant disk capacity.

The processing time of the printer includes a data transmission time 1202, an intermediate data generation time 1203 in the printer, and a shipping time 1204. A draw area is first obtained to obtain the data transmission time 1202.

Figure 15:
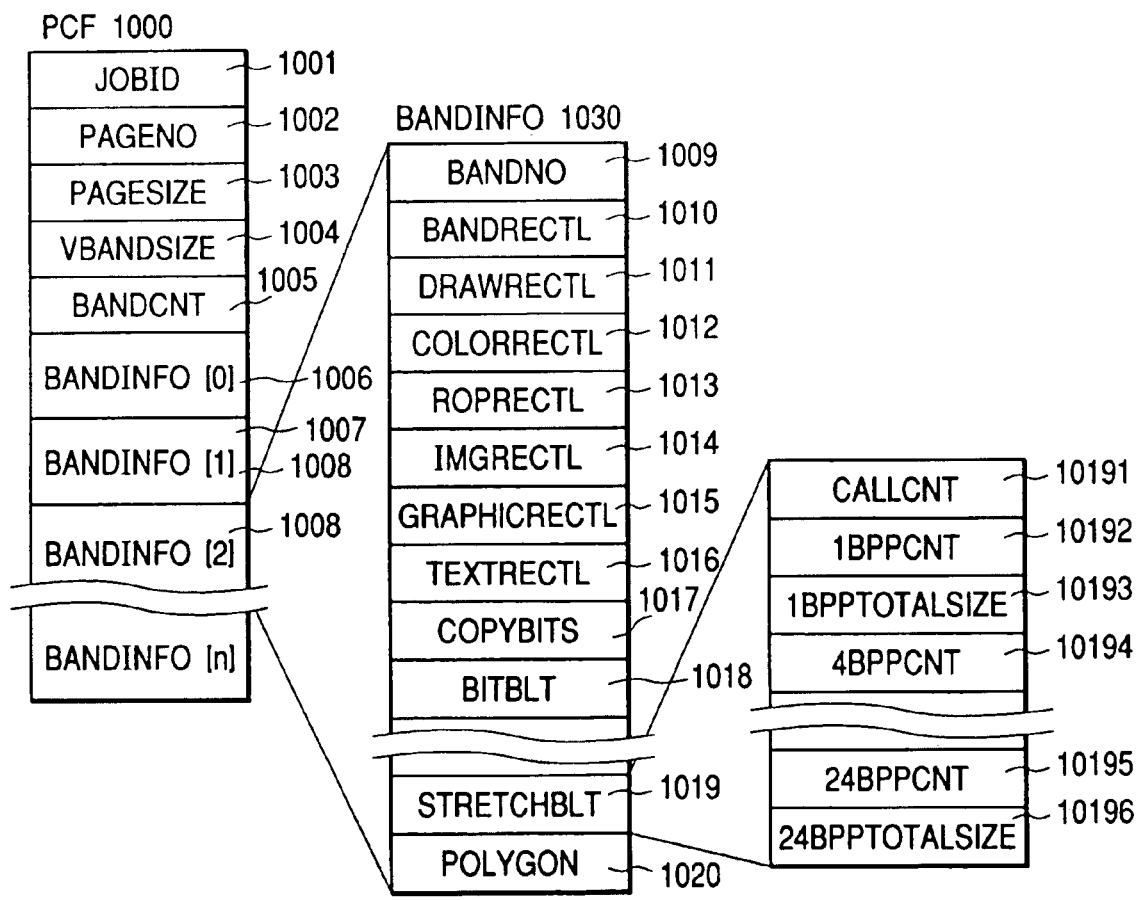
FIG. 15 is a schematic diagram showing the structure of the PCF.

The draw area is calculated by multiplying the DrawRectL area of each virtual band described in FIG. 15 by the layout information. A data size upon non-compression is obtained by multiplying the obtained draw area by the designated number of output gradations. In case of compressing the data, an accurate value of the transmission data size cannot be known unless a compression ratio is known. Therefore, an average value of the transmission data size is applied. Since the drawing area of each object has been known, the precision can be improved by obtaining an average value of the compression ratios of the respective objects.

Since the intermediate data generation time 1203 in the printer has already been converted into the data format depending on the device, only the storing process of the intermediate data is performed, the processing time is proportional to the draw area, and a proportional coefficient is obtained from an apparatus kind dependency value.

The shipping time 1204 depends on an engine throughput speed.

The processing time in the image mode is obtained by obtaining the above total value.

"Prediction of PDL Mode Processing Speed"

A PDL mode processing 1205 is also divided into a processing time of the printer driver and the process of the printer in a manner similar to the case of the image mode.

First, since the process of the printer driver is fundamentally only a command generation processing 1206 for converting the draw command handed from the system into the PDL command as it is, its processing speed is higher than that of the process of the driver of the image mode system. Therefore, it is hardly influenced by the CPU speed of the host machine or the vacant disk capacity.

The PDL mode processing speed is predicted on the basis of a command generation prediction coefficient of each object.

A data transmission time 1207 included in the processing time of the printer is influenced by a PDL command size and the speed of a transmission path. Since the size of the PDL command differs in dependence on an output mode (color, monochromatic, etc.), the kind of apparatus, or a version of a language, the PDL command size of each object is calculated by using the apparatus kind information collected by the despooler. Also in case of reducing the size by the layout process, since there is the data size which changes, the PDL command size is calculated also in consideration of the layout information.

A time that is required for working the received data is set to a shipping preparation time 1208 so as to be in time with the engine throughput of the printer. If the intermediate data can be sufficiently stored in the memory capacity of the printer, it is possible to perform what is called a banding process such that the drawing process and the shipping process are alternately performed by using two band memories. In this case, according to the processing speed of the printer, the continuous pages can be printed by the engine throughput. However, if the data exceeding an intermediate data storage permission capacity of the printer is transmitted or if a complicated arithmetic operation is necessary and the banding process is not in time, the printer abandons the banding process and enters a special processing mode for assuring the memory of one page. When the printer enters this mode, the processing speed of the printer extremely decreases. The time prediction in this instance depends on the size of installed memory, the CPU speed of the printer, or the ability of the hardware renderer of the printer.

A shipping time 1209 depends on the engine throughput.

5) Process for verifying whether the designated gradation output is possible by the selected reproducing means or not and selecting again the reproducing means by reducing the number of output gradations when it is determined that the designated gradation output is possible Even in a printer which can perform a high gradation output, when the size of installed memory is small, a case where it is impossible to output by the designated number of gradations and the resolution also exists. Even in such a case, the page printer automatically degrades the resolution or the number of gradations in the printer in the PDL mode, thereby preventing an output impossible state from occurring.

However, if the device dependent bitmap (data which has already been subjected to a halftone process of the number of output gradations and the resolution) in the print data that is generated by the process in the image mode processing is subjected to the degrading process by the printer, the picture quality remarkably deteriorates. Therefore, the high gradation cannot be designated when the capacity of the installed memory of the printer is not guaranteed.

According to the embodiment, in order to provide a system for dynamically switching the PDL mode and the image mode, it is enabled to designate the high gradation as in case of the PDL mode even when the size of installed memory is small.

The following methods are used to realize it.

(1) If the image mode is included in the selected processing system, the size (DataSize) at the time when the drawing commands of all of the logical pages included in the physical page have been converted into the intermediate data in the printer is predicted.

(2) The size of memory installed in the printer is obtained and the size (WorkSize) of the intermediate data storing unit is calculated.

(3) When DataSize>WorkSize, the number of output gradations is decreased and the reproducing means is selected again.

The optimum processing mode is selected by combining the above prediction results.

Figure 13:
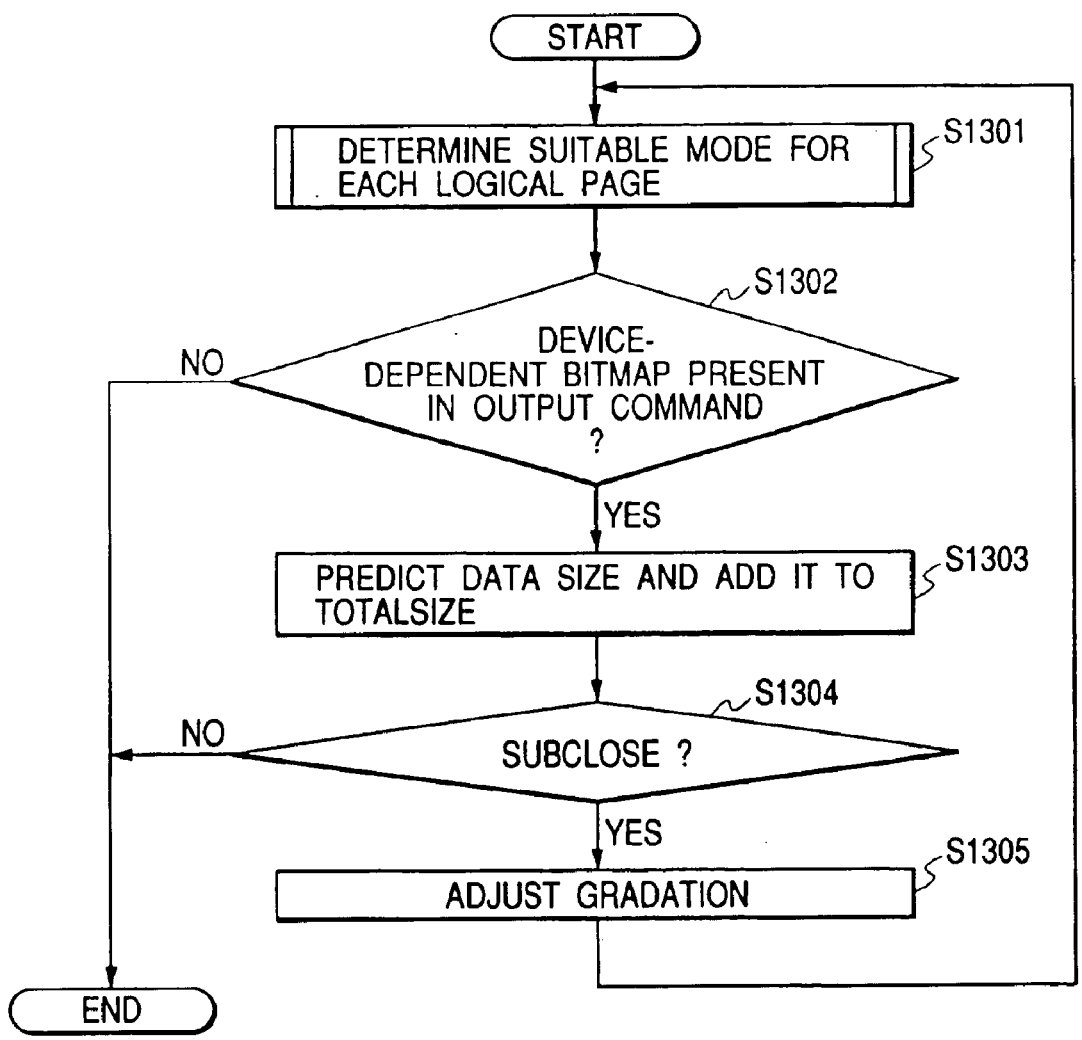
FIG. 13 is a flowchart showing a flow of a process for determining a processing mode when it is seen on a physical page unit basis according to the invention.
Figure 14:
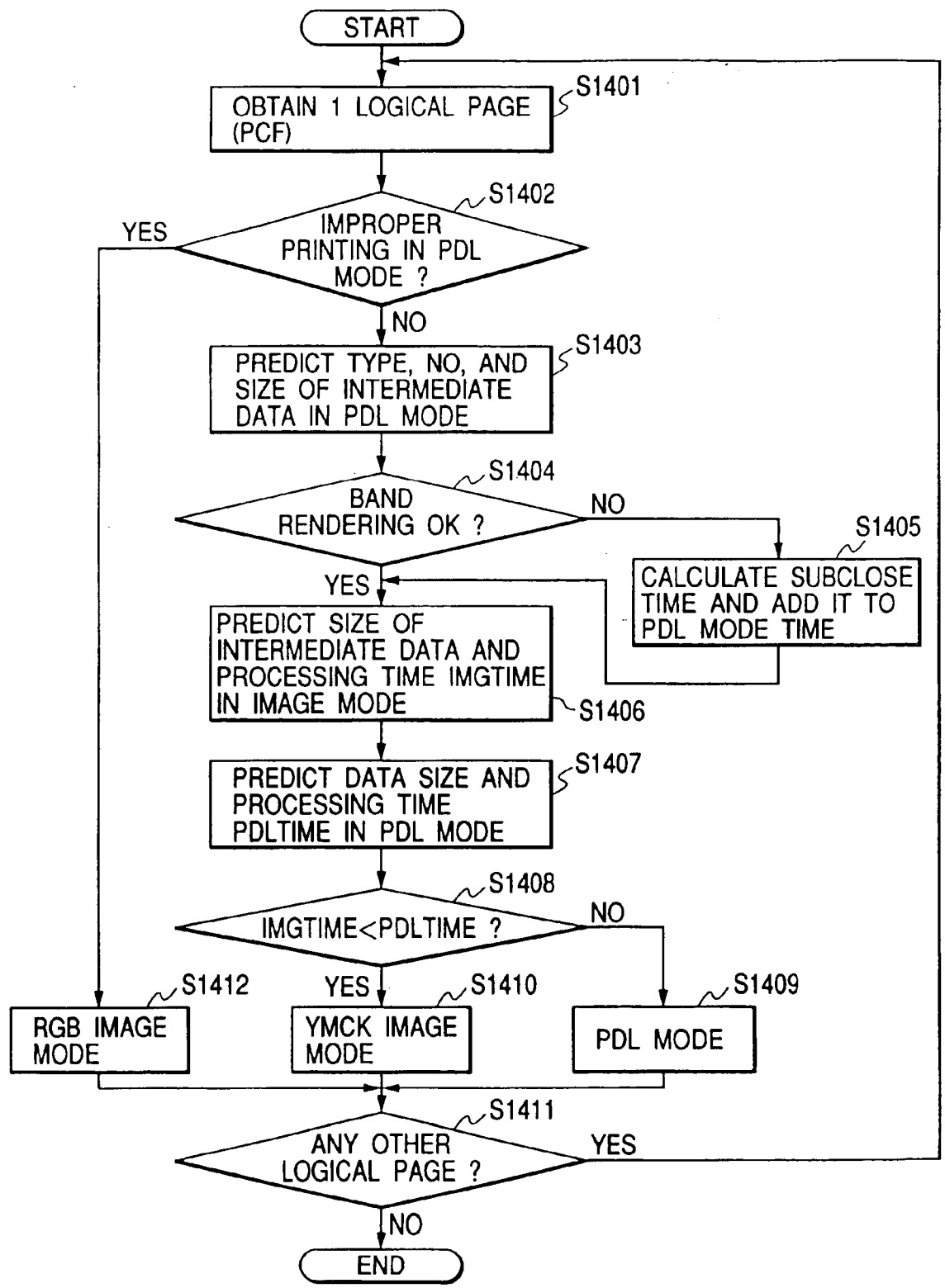
FIG. 14 is a flowchart showing a flow of a process for determining a processing mode when it is seen on a logical page unit basis according to the invention.

A flow for a step of discriminating the logical pages in the physical page in the printer driver will now be described with reference to flowcharts of FIGS. 13 and 14. A program regarding the flowcharts of FIGS. 13 and 14 is stored in the memory of the host computer and executed by the CPU.

"Flow for a step of determining the processing system of the physical page"

S1301: The optimum processing mode is determined every logical page in the physical page and step S1302 follows.

S1302: In the case where the device dependent bitmap exists in the output command, step S1303 follows. If such a bitmap does not exist, the processing routine is finished.

S1303: The size at the time when the print command in the logical page which is being calculated has been converted into the intermediate data in the printer is predicted and added to the total value (totalsize) of the intermediate data sizes of the pages calculated so far. Step S1304 follows.

S1304: When the data size obtained in step S1303 is larger than the size of intermediate data storing area calculated from the size of memory installed in the printer, step S1305 follows. When it is smaller, the processing routine is finished.

S1305: The number of gradations which is smaller than the designated number of gradations is set. The processing routine is returned to step S1301.

"Flow for a Step of Determining the Processing System of Each Logical Page"

S1401: One logical page information is obtained. Step S1402 follows.

S1402: In the case where the occurrence of the improper printing in the PDL mode is predicted, step S1412 follows. If there is no improper printing, step S1403 follows.

S1403: The kind, number, and size of the intermediate data which is held in the printer at the time when it has been processed in the PDL mode are predicted and step S1404 follows.

S1404: When it is determined that it is impossible to process by the band rendering, step S1405 follows. If the band rendering is possible, step S1406 follows.

S1405: A delay time which is caused due to the subclose is calculated and added to the PDL mode processing time and step S1406 follows.

S1406: The size and the processing time (IMGTime) of the intermediate data which is generated in the printer at the time when it has been processed in the image mode are predicted. Step S1407 follows.

S1407: The size and processing time (PDLTime) of the data in the printer at the time when it has been processed in the PDL mode are predicted. Step S1408 follows.

S1408: If IMGTime<PDLTime, step S1410 follows. If NO, step S1409 follows.

S1409: The logical page which is being processed is determined to be the PDL mode and a result is registered into the table. Step S1411 follows.

S1410: The logical page which is being processed is determined to be the YMCK image mode and a result is registered into the table. Step S1411 follows.

S1412: The logical page which is being processed is determined to be the RGB image mode and a result is registered into the table. Step S1411 follows.

S1411: When the logical page still exists, step S1401 follows. If there is no logical page, the processing routine is finished.

6) Process for performing the despooling process by the processing system selected by the selected reproducing means every logical page and ejecting the page on a physical page unit basis The despooling process is started at a timing when the processing systems and the number of processing gradations of all of the logical pages which are necessary to print one physical page.

The despooler first generates an initialization command of the page and sends it to the printer.

After that, the PDF file is read every logical page and the process of the draw command is performed in the processing system decided in 5). In this instance, a layout converting process such as a process for changing, magnifying, or reducing the drawing position is realized by handing the draw command added with the layout converting process designated by a layout conversion unit (3034) to the processing system.

The subclose will now be described.

The printer enters a subclosing state when the size of print command is so large that the intermediate language of one page cannot be stored. In the subclosing state, the intermediate languages accumulated so far are drawn into the memory space of one page, thereby releasing the memory in which the intermediate languages have been stored and enabling a print command to be newly read. In this instance, if the size of memory installed in the printer is small, the subclosing process cannot be performed by the designated number of gradations and the gradation is degraded. When the printer enters such a state, the processing speed of the printer remarkably decreases. Therefore, it is an effective processing mode switching to predict and avoid it.

The N-up printing process will now be described.

The N-up printing is a function which can designate the number of pages of a text formed by application software which can be printed on one paper by the printer driver. For example, the operation to print four pages onto one paper is called "4-up".

The N-up printing is realized by a method whereby a paper discharge command is not sent until the converting process of the data of N pages in the physical page is finished, thereby allowing the printer to process the print command of N pages as information of one page.

Figure 17:
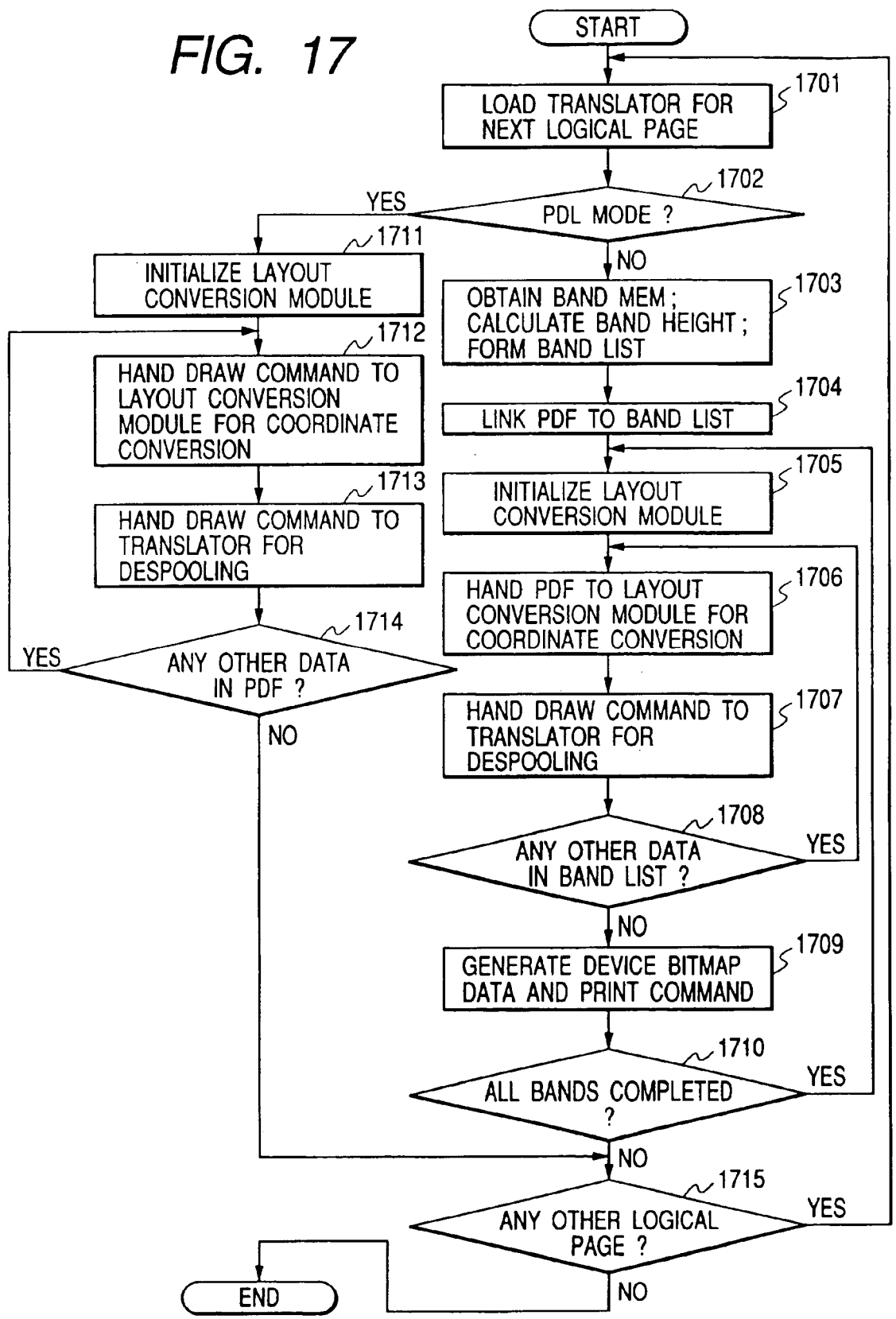
FIG. 17 is a diagram showing a despooling process at the time of an N-up process.

A flow for the N-up printing process after the processing system of the logical page unit was decided will be described with reference to a flowchart of FIG. 17. A program regarding the flowchart is stored in the memory of the host computer 200 and executed by the CPU.

S1701: A translator module which was determined to perform the next logical page is loaded and step S1702 follows.

S1702: In case of the PDL mode, step S1710 follows. In case of the image mode, step S1703 follows.

S1703: The band memory which is used for the drawing process is obtained, the band height is calculated from the page width, and a band list is formed. Step S1704 follows.

S1704: The PDF (intermediate data) is linked to the band list formed in step S1703. Step S1705 follows.

S1705: A layout conversion module is initialized in accordance with the band area which will be processed from now on. Step S1706 follows.

S1706: The intermediate languages (PDF) linked to the band list for the current band are sequentially handed to the layout conversion module and a coordinate converting process is performed. Step S1207 follows.

S1707: The coordinate converted draw command is handed to the translator (image mode renderer) and the drawing process is executed on the prepared band memory space. Step S1708 follows.

S1708: If the data is still linked to the band list, step S1706 follows. If no data is linked thereto, step S1709 follows.

S1709: Device bitmap data (image data of 1, 2, or 4 bits per color of YMCK) is formed from the result drawn on the band and the print command is generated in consideration of the layout information obtained from the logical page position. Step S1710 follows.

S1710: If the processes for all bands were finished, step S1715 follows. If they are not finished yet, step S1705 follows.

S1711: The layout conversion module is initialized in accordance with the logical page area. Step S1712 follows.

S1712: The draw commands in the PDF are sequentially handed to the layout conversion module and the coordinate converting process is executed. Step S1713 follows.

S1713: The draw command subjected to the coordinate conversion is handed to the PDL translator and the print command is formed. Step S1714 follows.

S1714: If there is still a draw command in the PDF, step S1712 follows.

S1715: If there is still the logical page, step S1701 follows. If there is no logical page, the processing routine of the present job is finished.

A print command generating process in the N-up processing mode will now be described with reference to a schematic diagram of FIG. 18.

Figure 18:
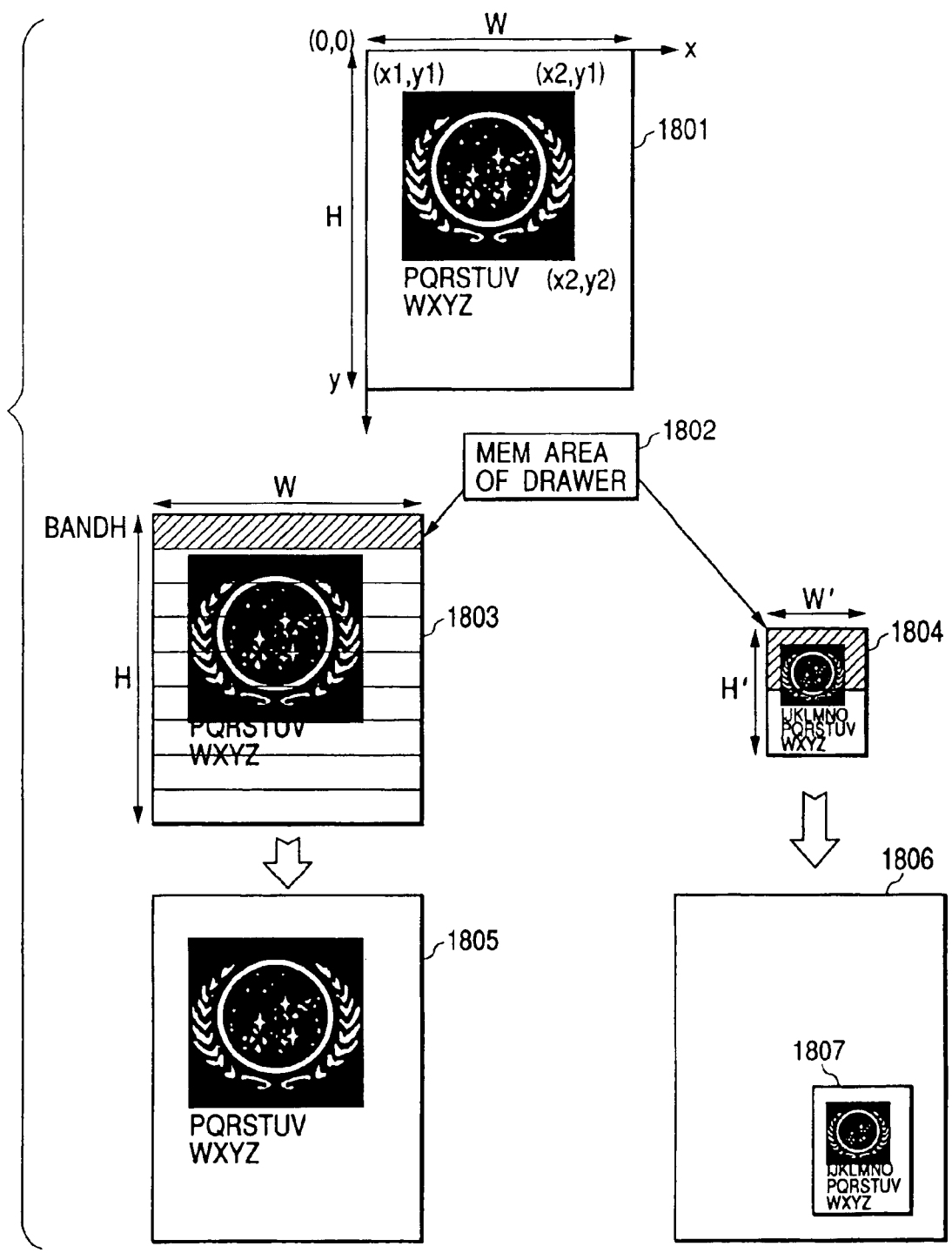
FIG. 18 is a diagram for explaining a print command generating process at the time of the N-up process.

Reference numeral 1801 denotes a page of a heavy process to which the high resolution image used in the description also in FIG. 18 has been pasted. In case of processing the current page in the image mode, a memory area 1804 for the drawing process is obtained and used as a band memory 1805, thereby enabling the drawing process to be performed without having a memory space of the whole page.

In case of directly outputting at an equal magnification, the drawing memory of 4 Mbytes is used. To perform the processes of the page of the A4 size by the RGB24BPP image renderer, the memory is divided into 17 band areas having the height of bandH. (1803)

The spooled PDF has inherently been instructed so as to draw the image onto the page having a width W and a height H at the upper left position (0, 0) of the drawing origin page. To draw the image into the divided band memory areas, each band list for band is prepared and the PDF data regarding each band is linked again in the drawing designating order. The draw commands linked to the formed band list are handed to the translator (renderer) every band, thereby realizing the drawing process.

For example, as for the image data in the page 1801 in FIG. 18, the image defined by the upper left drawing position (X1, Y1) and the lower right drawing position (X2, Y2) exist in a range from the second to seventh bands in a band area 1803. In the drawing process, the value obtained by converting the Y coordinate value Y1 of the drawing position information stored in the PDF into the value of the coordinate system in the band position which is being processed at present is set into the translator (renderer) and clipping processed in the band area, thereby realizing such a drawing process.

That is, assuming that the number of the first band is set to 0 and the number of the band which is being processed at present is set to bandNo, new coordinates are shown by Y1'=Y1−bandH*bandno Y2'=Y2−bandH*bandno.

The output result developed in the band memory space of RGB24BPP around the generated pixel is converted into the color space of 8 bits per color of YMCK on a band unit basis and, after that, it is degraded to the number of output gradations (1, 2, or 4 bits per color) by a halftone process. By adding the command of the image draw command to the data, the draw command of this page is obtained.

The printing process in the 4-up output mode will now be described. It is assumed that prior to executing the process of the current page, the processes of three pages among the pages including only the characters have already been finished by the PDL translator.

In case of processing the present page by the RGB24BPP image renderer, in order to perform the processes which are ¼ of those of the A4 page by the RGB24BPP renderer, only four band memories are needed for the memory area of 4 Mbytes in a manner similar to the equal magnification.

Since the spooled PDF has inherently been instructed so as to draw an image onto the page having a width of W and a height of H, in order to perform the 4-up printing, such an area has to be coordinate converted into an area having a width w' and a height h' as shown at 1804. Although a band list for each band is formed in a manner similar to the case in the equal magnification printing mode, at this time, the coordinate values of the draw command in the PDF are converted into values in a coordinate space of the drawing destination. For example, the upper left drawing position (X1, Y1) and the lower right drawing position (X2, Y2) of the image data in the page 1801 are converted as follows, respectively.

(X1'=X1*(w'/W), Y1'=Y1*(h'/H))

(X2'=X2*(w'/W), Y2'=Y2*(h'/H))

The drawing process is realized by a method whereby the Y coordinate value of the converted drawing position of the data linked to the band list is further converted into the value of the coordinate system in the band position during the processing and the resultant converted value is set into the translator (renderer) and clip-processed in the band area.

The output result developed in the band memory space of RGB24BPP around the formed pixel is color space converted into 8 bits per color of YMCK on a band unit basis and, thereafter, it is degraded to the number of output gradations (1, 2, or 4 bits per color) by the halftone process. The draw commands corresponding to the current logical pages can be obtained by adding the command of the image draw command converted into the drawing position for the 4-up printing to the generated data.

After all of the draw commands of four pages were transmitted, the paper discharge command is sent to the printer.

(Further detailed description on the printer side)

To realize the invention, the printer needs the following functions.

"Function for Directly Drawing Device Bitmap"

The data in the RGB color space is subjected to a color converting process in the printer and becomes device dependent color space data (YMCK) and held as intermediate data. At the time of drawing into the page memory, the intermediate data is subjected to the halftone process and becomes a device bitmap format whose gradations were degraded. According to the invention, by adding the device bitmap data to the PDL command, the processing mode switching of the logical page unit is realized. The printer needs to have a processing system such that when the device bitmap data is received, it is held as intermediate data as it is and drawn in the page memory without performing the halftone process.

The mode selection and its flow will now be described with reference to FIGS. 19 and 20.

Figure 19:
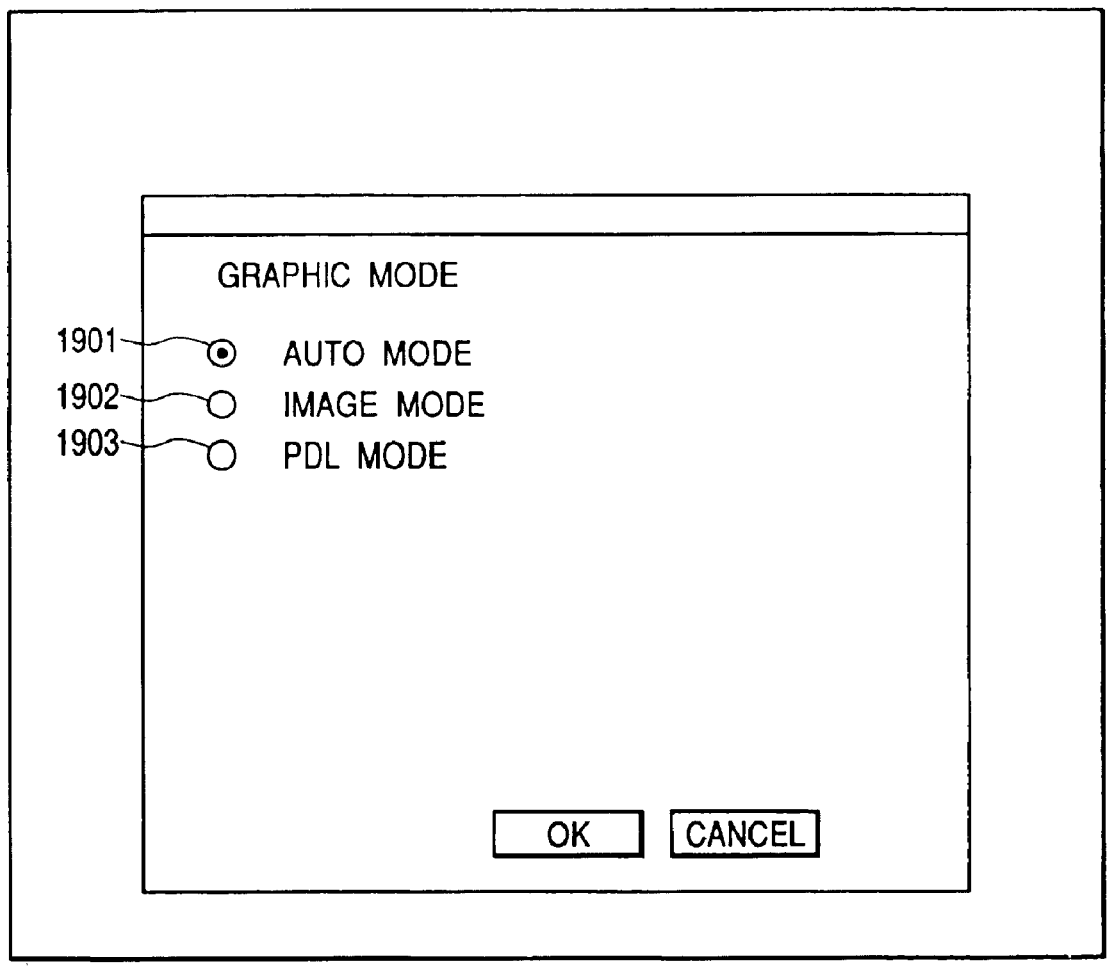
FIG. 19 is a diagram showing a graphic mode selecting picture plane.
Figure 20:
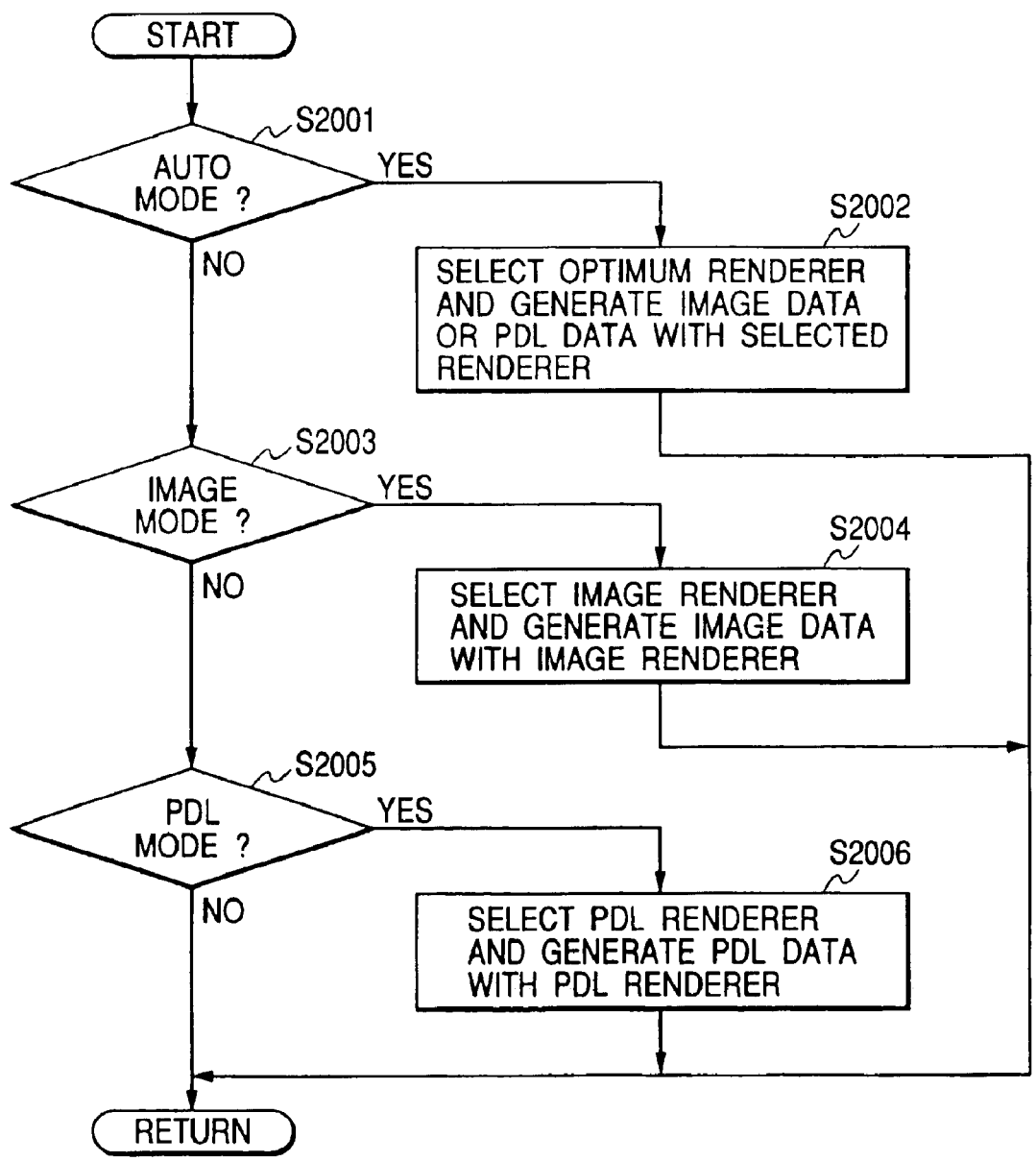
FIG. 20 is a diagram showing a graphic mode selecting process.

FIG. 19 shows a graphic mode setting picture plane of the printer driver.

When an auto mode 1901 is designated, the mode is determined by the optimum mode determining process in FIG. 5 or 14, the data from the application is analyzed and converted into image data or PDL data, and transmitted to the printer.

When an image mode 1902 is designated, the image renderer 3036 is selected and the data from the application is converted into the image data and transmitted to the printer.

When a PDL mode 1903 is designated, the PDL 3035 is selected and the data from the application is converted into the PDL data and transmitted to the printer.

A graphic mode selecting process will now be described with reference to FIG. 20. A program regarding the flowchart of FIG. 20 is stored in the memory of the host computer 200 and executed by the CPU.

Whether the auto mode has been designated or not is discriminated in step S2001. If YES, step S2002 follows. If NO, step S2003 follows.

In step S2002, the data from the application is analyzed by the process in FIG. 5 or 14, the optimum renderer is selected, and the data from the application is converted into the image data or PDL data by using the selected renderer and transmitted to the printer.

Whether the image mode has been designated or not is discriminated in step S2003. If YES, step S2004 follows. If NO, step S2005 follows.

In step S2004, the image renderer 3036 is selected and the data from the application is converted into image data by using the selected renderer and transmitted to the printer.

Whether the PDL mode has been designated or not is discriminated in step S2005. If YES, step S2006 follows. If NO, the processing routine is finished.

In step S2006, the PDL renderer 3035 is selected and the data from the application is converted into PDL data by using the selected renderer and transmitted to the printer.

(Third Embodiment)

The third embodiment in the invention will now be described hereinbelow. In the embodiment, an explanation of a construction similar to that of the first embodiment is omitted.

Although the switching method of the printing mode in the color mode of the color printer has been described in the first embodiment, the invention can be also applied to the monochromatic mode of a monochromatic printer or a color printer. A portion of the switching method in the monochromatic mode which is different from that in the color mode will be described hereinbelow. In the monochromatic mode, although it is unnecessary to check the color data among the following check items, <1>color data check
<2>data size check
<3>drawing speed check
<4>logical operation value check The other items are similarly checked and check results are similarly used as mode switching information.

In the monochromatic mode, in case of holding the data as monochromatic data in the printer, the size checked in the data size check is used.

The Device image mode to which the operating mode is shifted in the case where the speed becomes slow if the data is processed in the PDL mode due to the checks of <2>and <3>corresponds to the image mode of 1, 2, or 4 bits of Black.

The RGB24BPP image mode to which the operating mode escapes in the case where an abnormality is detected by the logical operation value check of <4>is held as it is.

(Fourth Embodiment)

The fourth embodiment of the invention will now be described hereinbelow. An explanation of a construction of the embodiment similar to that of the first embodiment is omitted here.

Although the first embodiment has been described with respect to the case where all of the PDL mode, Device image mode, and RGB24BPP image mode are provided, even in the case where one of them is not provided, by spooling and checking the data, the operating mode can be switched to the mode by which the data can be most accurately outputted at the highest speed.

(Other Embodiments)

The invention can be applied to a system comprising a plurality of apparatuses (for example, a host computer, an interface device, a reader, a printer, and the like) or can be also applied to an apparatus (for example, a copying apparatus, a facsimile apparatus, or the like) comprising one equipment.

Naturally, the objects of the invention can be also accomplished by a method whereby a storage medium on which software program codes called a printer driver to realize the functions of the embodiments mentioned above have been recorded is supplied to a system or an apparatus and a computer (or a CPU or an MPU) of the system or apparatus reads out and executes the program codes stored on the storage medium.

In this case, the program codes themselves read out from the storage medium realize the functions of the embodiments mentioned above and the storage medium on which the program codes have been stored constructs the invention.

As a storage medium to supply the program codes, for example, a floppy disk, a hard disk, an optical disk, a magnetooptic disk, a CD-ROM, a CD-R, a magnetic tape, a non-volatile memory card, an ROM, or the like can be used.

Naturally, the invention also incorporates not only a case where the computer executes the read-out program codes, so that the functions of the embodiments mentioned above are realized, but also a case where the OS (Operating System) or the like which operates on the computer executes a part or all of the actual processes on the basis of instructions of the program codes and the functions of the embodiments mentioned above are realized by those processes.

Further, the invention obviously incorporates a case where the program codes read out from the storage medium are written into a memory provided for a function expanding board inserted in a computer or a function expanding unit connected to the computer and, after that, a CPU or the like equipped for the function expanding board or function expanding unit executes a part or all of the actual processes on the basis of instructions of the program codes, and the functions of the embodiments mentioned above are realized by those processes.

In case of applying the invention to the storage medium, the program codes corresponding to the flowcharts described above are stored onto the storage medium.

As described above, according to the embodiments of the invention, the printer driver has the mechanism for holding the data of at least one page in the print data that is handed from the OS, when the print data is held, it is checked to discriminate the optimum mode in which the page or band is processed, and the data is processed on a page or band unit basis in the determined mode, thereby enabling the drawing process to be accurately performed at a high speed.

When one page is outputted in a plurality of modes, by processing the data with respect to the maximum band height at which the data can be processed in the selected mode, the outputting process can be efficiently performed.

As described above, according to the invention, the printing can be performed at a high speed by selecting the optimum converting means in accordance with the print data.

According to the invention, even when the N-up is designated, since the converting means is selected on a logical page unit basis, the printing can be performed at a high speed.

What is claimed is:

1. An information processing apparatus comprising:
   first converting means for converting print data into image data;
   second converting means for converting the print data into code data for allowing a printer to generate the image data;
   predicting means for predicting a printing time, including a data processing time and a data transmission time, using the image data converted by said first converting means and a printing time, including a data processing time and a data transmission time, using the code data converted by said second converting means;
   discriminating means for discriminating whether the printing time using the image data is shorter than the printing time using the code data or not on the basis of a prediction result by said predicting means; and
   selecting means for selecting said first converting means when it is determined by said discriminating means that the printing time using the image data is shorter and selecting said second converting means when it is determined by said discriminating means that the printing time using the image data is not shorter.

2. An apparatus according to claim 1, wherein said predicting means predicts the printing time on the basis of a processing time and a transmission time on a host computer side and a processing time on the printer side.

3. An apparatus according to claim 1, wherein the printing time using the image data includes a drawing time, a transmission time, and a processing time of the printer, and the printing time using the code data includes a command generation time and a subclosing time.

4. An apparatus according to claim 1, wherein the printing time using the image data includes a drawing time, a transmission time, an intermediate data generation time, and a shipping time, and the printing time using the code data includes a command generation time, a transmission time, a shipping preparation time, and a shipping time.

5. An apparatus according to claim 1, wherein said selecting means selects the converting means on a logical page unit basis.

6. An apparatus according to claim 1, further comprising:
discriminating means for discriminating whether a subclose occurs in the printer if a printing is performed by the data converted by the converting means selected by said selecting means or not; and
means for degrading a gradation of the data converted by said converting means when it is determined by said discriminating means that the subclose occurs.

7. An apparatus according to claim 1, further comprising judging means for judging whether an improper drawing occurs or not by checking the print data,
and wherein said selecting means selects said first converting means when it is determined by said judging means that the improper drawing occurs, and selects said second converting means when it is determined by said judging means that the improper drawing does not occur.

8. An apparatus according to claim 1, further comprising:
third converting means for converting the print data into image data;
judging means for judging whether an improper drawing occurs or not by checking the print data; and
discriminating means for discriminating whether a time which is required for processing by the code data is longer than a time which is required for processing by the image data or not when it is determined by said judging means that the improper drawing does not occur,
and wherein said selecting means selects said third converting means when it is determined by said discriminating means that the time which is required for processing by the code data is longer than the time which is required for processing by the image data, and selects said second converting means when it is determined by said discriminating means that the time which is required for processing by the code data is not longer than the time which is required for processing by the image data.

9. An apparatus according to claim 8, wherein said first converting means performs a logical operation by RGB and said third converting means performs a logical operation by YMCK.

10. An information processing method using first converting means for converting print data into image data and second converting means for converting the print data into code data for allowing a printer to generate the image data, comprising:
a predicting step of predicting a printing time, including a data processing time and a data transmission time, using the image data converted by said first converting means and a printing time, including a data processing time and a data transmission time, using the code data converted by said second converting means;
a discriminating step of discriminating whether the printing time using the image data is shorter than the printing time using the code data or not on the basis of a prediction result by said predicting step; and
a selecting step of selecting said first converting means when it is determined by said discriminating step that the printing time using the image data is shorter and selecting said second converting means when it is determined by said discriminating step that the printing time using the image data is not shorter.

11. A method according to claim 10, wherein in said predicting step, the printing time is predicted on the basis of a processing time and a transmission time on a host computer side and a processing time on the printer side.

12. A method according to claim 10, wherein the printing time using the image data includes a drawing time, a transmission time, and a processing time of the printer, and the printing time using the code data includes a command generation time and a sublosing time.

13. A method according to claim 10, wherein the printing time using the image data includes a drawing time, a transmission time, an intermediate data generation time, and a shipping time, and the printing time using the code data includes a command generation time, a transmission time, a shipping preparation time, and a shipping time.

14. A method according to claim 10, wherein in said selecting step, the converting means is selected on a logical page unit basis.

15. A method according to claim 10, further comprising:
a discriminating step of discriminating whether a subclose occurs in the printer if a printing is performed by the data converted by the converting means selected by said selecting step or not, and
a step of degrading a gradation of the data converted by said converting means when it is determined by said discriminating step that the subclose occurs.

16. A method according to claim 10, further comprising a judging step of judging whether an improper drawing occurs or not by checking the print data,
and wherein in said selecting step, said first converting means is selected when it is determined by said judging step that the improper drawing occurs, and said second converting means is selected when it is determined by said judging step that the improper drawing does not occur.

17. A method using third converting means for converting the print data into image data according to claim 10, further comprising:
a judging step of judging whether an improper drawing occurs or not by checking the print data; and
a discriminating step of discriminating whether a time which is required for processing by the code data is longer than a time which is required for processing by the image data or not when it is determined by said judging step that the improper drawing does not occur,
and wherein in said selecting step, said third converting means is selected when it is determined by said discriminating step that the time which is required for processing by the code data is longer than the time which is required for processing by the image data, and said second converting means is selected when it is determined by said discriminating step that the time which is required for processing by the code data is not longer than the time which is required for processing by the image data.

18. A method according to claim 17, wherein said first converting means performs a logical operation by RGB and said third converting means performs a logical operation by YMCK.

19. A storage medium which stores a program using first converting means for converting print data into image data and second converting means for converting the print data into code data for allowing a printer to generate the image data, wherein said program comprises:
   a predicting step of predicting a printing time, including a data processing time and a data transmission time, using the image data converted by said first converting means and a printing time, including a data processing time and a data transmission time, using the code data converted by said second converting means;
   a discriminating step of discriminating whether the printing time using the image data is shorter than the printing time using the code data or not on the basis of a prediction result by said predicting step; and
   a selecting step of selecting said first converting means when it is determined by said discriminating step that the printing time using the image data is shorter and selecting said second converting means when it is determined by said discriminating step that the printing time using the image data is not shorter.

20. A medium according to claim 19, wherein in said predicting step, the printing time is predicted on the basis of a processing time and a transmission time on a host computer side and a processing time on the printer side.

21. A medium according to claim 19, wherein the printing time using the image data includes a drawing time, a transmission time, and a processing time of the printer, and the printing time using the code data includes a command generation time and a subclosing time.

22. A medium according to claim 19, wherein the printing time using the image data includes a drawing time, a transmission time, an intermediate data generation time, and a shipping time, and the printing time using the code data includes a command generation time, a transmission time, a shipping preparation time, and a shipping time.

23. A medium according to claim 19, wherein in said selecting step, the converting means is selected on a logical page unit basis.

24. A medium according to claim 19, wherein said program further comprises:
   a discriminating step of discriminating whether a subclose occurs in the printer if a printing is performed by the data converted by the converting means selected by said selecting step or not; and
   a step of degrading a gradation of the data converted by said converting means when it is determined by said discriminating step that the subclose occurs.

25. A medium according to claim 19, wherein said program further comprises a judging step of judging whether an improper drawing occurs or not by checking the print data, and in said selecting step, said first converting means is selected when it is determined by said judging step that the improper drawing occurs, and said second converting means is selected when it is determined by said judging step that the improper drawing does not occur.

26. A medium which stores a program using third converting means for converting the print data into image data according to claim 19, wherein said program further comprises:
   a judging step of judging whether an improper drawing occurs or not by checking the print data; and
   a discriminating step of discriminating whether a time which is required for processing by the code data is longer than a time which is required for processing by the image data or not when it is determined by said judging step that the improper drawing does not occur,
   and in said selecting step, said third converting means is selected when it is determined by said discriminating step that the time which is required for processing by the code data is longer than the time which is required for processing by the image data, and said second converting means is selected when it is determined by said discriminating step that the time which is required for processing by the code data is not longer than the time which is required for processing by the image data.

27. A medium according to claim 26, wherein said first converting means performs a logical operation by RGB and said third converting means performs a logical operation by YMCK.

28. A computer having a PDL mode, in which a drawing command is converted into a PDL data and the converted PDL data is transmitted to a printer, and an image mode, in which a drawing command is converted into image data and the converted image data is transmitted to the printer, said computer comprising:
   a first computing unit computing a processing time, including a data processing time and a data transmission time, in the image mode;
   a second computing unit computing a processing time, including a data processing time and a data transmission time, in the PDL mode; and
   a selection unit selecting the PDL mode when the processing time in the image mode computed by said first computing unit is longer than the processing time in the PDL mode computed by said second computing unit, and selecting the image mode when the processing time in the image mode computed by said first computing unit is not longer than the processing time in the PDL mode computed by said second computing unit.

29. A computer according to claim 28, further comprising a judging unit judging whether an improper printing occurs in the PDL mode, wherein if said judging unit judges that an improper printing occurs in the PDL mode, said selection unit selects an RGB image mode, and if said judging unit judges that an improper printing does not occur in the PDL mode, said selection unit selects the PDL mode when the processing time in the image mode computed by said first computing unit is longer than the processing time in the PDL mode computed by said second computing unit, and selects a YMCK image mode when the processing time in the image mode computed by said first computing unit is not longer than the processing time in the PDL mode computed by said second computing unit.

30. A computer according to claim 28, wherein the processing time in the PDL mode includes a subclosing time in the event that a band processing is impossible.

31. A computer according to claim 28, wherein the processing time in the PDL mode includes a PDL command generation time, a transmission time, a shipping preparation time and a shipping time, and the processing time in the image mode includes a drawing time, a transmission time and a shipping time.

32. A computer that has a PDL mode, in which a drawing command is converted into a PDL data and the converted PDL data is transmitted to a printer, and an image mode, in which a drawing command is converted into an image data and the converted image data is transmitted to the printer, said computer comprising:

a judging unit judging whether an improper printing occurs in the PDL mode; and a selection unit selecting the image mode when said judging unit judges that an improper printing occurs in the PDL mode, and selecting the PDL mode when said judging unit judges that an improper printing does not occur in the PDL mode.

33. A print method based on a printer driver that has a PDL mode, in which a drawing command is converted into a PDL data and the converted PDL data is transmitted to a printer, and an image mode, in which a drawing command is converted into an image data and the converted image data is transmitted to the printer, said method comprising:

a first computing step computing a processing time in the image mode;

a second computing step computing a processing time, including a data processing time and a data transmission time, in the PDL mode; and a selection step selecting the PDL mode when the processing time in the image mode computed in said first computing step is longer than the processing time in the PDL mode computed in said second computing step, and selecting the image mode when the processing time in the image mode computed in said first computing step is not longer than the processing time in the PDL mode computed in said second computing step.

34. A method according to claim 33, further comprising a judging step judging whether an improper printing occurs in the PDL mode, wherein if said judging step judges that an improper printing occurs in the PDL mode, said selection step selects an RGB image mode, and if said judging step judges that an improper printing does not occur in the PDL mode, said selection step selects the PDL mode when the processing time in the image mode computed in said first computing step is longer than the processing time in the PDL mode computed in said second computing step, and selects a YMCK image mode when the processing time in the image mode computed in said first computing step is not longer than the processing time in the PDL mode computed in said second computing step.

35. A method according to claim 33, wherein the processing time in the PDL mode includes a subclosing time in the event that a band processing is impossible.

36. A method according to claim 33, wherein the processing time in the PDL mode includes a PDL command generation time, a transmission time, a shipping preparation time and a shipping time, and the processing time in the image mode includes a drawing time, a transmission time and a shipping time.

37. A print method based on a printer driver that has a PDL mode, in which a drawing command is converted into a PDL data and the converted PDL data is transmitted to a printer, and an image mode, in which a drawing command is converted into an image data and the converted image data is transmitted to the printer, said method comprising:

a judging step judging whether an improper printing occurs in the PDL mode; and a selection step selecting the image mode when said judging step judges that an improper printing occurs in the PDL mode, and selecting the PDL mode when said judging step judges that an improper printing does not occur in the PDL mode.

38. A computer-executable program stored on a computer-readable medium, the computer program having a PDL mode, in which a drawing command is converted into a PDL data and the converted PDL data is transmitted to a printer, and an image mode, in which a drawing command is converted into an image data and the converted image data is transmitted to the printer, said program comprising:

a first computing step computing a processing time in the image mode;

a second computing code computing a processing time, including a data processing time and a data transmission time, in the PDL mode; and a selection step selecting the PDL mode when the processing time in the image mode computed in said first computing step is longer than the processing time in the PDL mode computed in said second computing step, and selecting the image mode when the processing time in the image mode computed in said first computing step is not longer than the processing time in the PDL mode computed in said second computing step.

39. A computer-executable program stored on a computer-readable medium according to claim 38, further comprising a judging step judging whether an improper printing occurs in the PDL mode, wherein if said judging step judges that an improper printing occurs in the PDL mode, said selection step selects an RGB image mode, and if said judging step judges that an improper printing does not occur in the PDL mode, said selection step selects the PDL mode when the processing time in the image mode computed in said first computing step is longer than the processing time in the PDL mode computed in said second computing step, and selects a YMCK image mode when the processing time in the image mode computed in said first computing step is not longer than the processing time in the PDL mode computed in said second computing step.

40. A computer-executable program stored on a computer-readable medium method according to claim 38, wherein the processing time in the PDL mode includes a subclosing time in the event that a band processing is impossible.

41. A computer-executable program stored on a computer-readable medium according to claim 38, wherein the processing time in the PDL mode includes a PDL command generation time, a transmission time, a shipping preparation time and a shipping time, and the processing time in the image mode includes a drawing time, a transmission time and a shipping time.

42. A computer-executable program stored on a computer-readable medium, the computer program having a PDL mode, in which a drawing command is converted into a PDL data and the converted PDL data is transmitted to a printer, and an image mode, in which a drawing command is converted into an image data and the converted image data is transmitted to the printer, said program comprising:

a judging step judging whether an improper printing occurs in the PDL mode; and a selection step selecting the image mode when said judging step judges that an improper printing occurs in the PDL mode, and selecting the PDL mode when said judging step judges that an improper printing does not occur in the PDL mode.

* * * * *

UNITED STATES PATENT AND TRADEMARK OFFICE
CERTIFICATE OF CORRECTION

PATENT NO. : 6,963,412 B1  
APPLICATION NO. : 09/605008  
DATED : November 8, 2005  
INVENTOR(S) : Toda It is certified that error appears in the above-identified patent and that said Letters Patent is hereby corrected as shown below:

COLUMN 5:
Line 35, "those" should read -- this --.

COLUMN 6:
Line 51, "is come" should read -- comes --.

COLUMN 10:
Line 11, "Fstored." should read -- stored --.

COLUMN 12:
Line 6, "a" should read -- α --.

COLUMN 15:
Line 27, "YMCKLBPP" should read -- YMCK1BPP --.

COLUMN 17:
Line 47, "psosre" should read -- psoSre --.

COLUMN 18:
Line 2, "sodset" should read -- soDest --.

COLUMN 30:
Line 22, "sublosing" should read -- subclosing --.

Signed and Sealed this

Twenty-fourth Day of October, 2006

JON W. DUDAS  
*Director of the United States Patent and Trademark Office*